(12) United States Patent
Wu et al.

(10) Patent No.: US 11,887,630 B2
(45) Date of Patent: Jan. 30, 2024

(54) MULTIMEDIA DATA PROCESSING METHOD, MULTIMEDIA DATA GENERATION METHOD, AND RELATED DEVICE

(71) Applicant: Beijing Bytedance Network Technology Co., Ltd., Beijing (CN)

(72) Inventors: Fan Wu, Beijing (CN); Xiaoran Zhang, Beijing (CN); Qiong Shan, Beijing (CN); Xin Li, Beijing (CN); Wenhai Zhang, Beijing (CN); Jinmin Li, Beijing (CN); Longkai Wen, Beijing (CN); Lifeng Zeng, Beijing (CN)

(*) Notice: Subject to any disclaimer, the term of this patent is extended or adjusted under 35 U.S.C. 154(b) by 0 days.

(21) Appl. No.: 18/147,975

(22) Filed: Dec. 29, 2022

(65) Prior Publication Data
US 2023/0144094 A1 May 11, 2023

Related U.S. Application Data

(63) Continuation of application No. PCT/CN2021/114502, filed on Aug. 25, 2021.

(30) Foreign Application Priority Data

Sep. 4, 2020 (CN) .......................... 202010924421.9

(51) Int. Cl.
*G11B 27/036* (2006.01)
*G06F 40/166* (2020.01)
(Continued)

(52) U.S. Cl.
CPC ........ *G11B 27/036* (2013.01); *G06F 3/04847* (2013.01); *G06F 40/166* (2020.01); *G11B 27/34* (2013.01)

(58) Field of Classification Search
CPC ... G11B 27/036; G11B 27/34; G06F 3/04847; G06F 40/166
(Continued)

(56) References Cited

U.S. PATENT DOCUMENTS 9,329,762 B1 * 5/2016 Schultz ............... G06F 3/04845
10,726,874 B1 * 7/2020 Smith .................. H04N 9/8715
(Continued)

FOREIGN PATENT DOCUMENTS

CN 101755303 B 7/2015
CN 108028054 A 5/2018
(Continued)

OTHER PUBLICATIONS

China National Intellectual Property Administration, Office Action and Search Report Issued in Application No. 202010924421.9, dated Jul. 28, 2021, 7 pages.
(Continued)

*Primary Examiner* — Thai Q Tran
*Assistant Examiner* — Stephen R Smith
(74) *Attorney, Agent, or Firm* — Alleman Hall Creasman & Tuttle LLP

(57) ABSTRACT

Provided are a multimedia data processing method, a multimedia data generation method, and a related device, which relate to the technical field of computers. The processing method comprises: acquiring multimedia data; displaying an editing page, wherein the editing page displays material data in the multimedia data; in response to a marking operation being carried out on at least one piece of material data, marking the at least one piece of material data; and in response to a template generation instruction, removing the marked material data from the multimedia data and generating a template.

20 Claims, 15 Drawing Sheets

(51) Int. Cl.
*G06F 3/04847* (2022.01)
*G11B 27/34* (2006.01)

(58) Field of Classification Search
USPC .................. 386/278, 280; 715/234; 717/113
See application file for complete search history.

(56) References Cited

U.S. PATENT DOCUMENTS

| | | | |
|---|---|---|---|
| 2005/0108233 A1 | 5/2005 | Metsatahti et al. | |
| 2007/0083851 A1* | 4/2007 | Huang | G06F 40/186 717/113 |
| 2007/0240072 A1* | 10/2007 | Cunningham | G06F 3/0482 715/764 |
| 2012/0284625 A1 | 11/2012 | Kalish et al. | |
| 2014/0095978 A1* | 4/2014 | Chang | G06F 16/958 715/234 |
| 2015/0139613 A1* | 5/2015 | Mondelore | G11B 27/34 386/280 |
| 2017/0062009 A1* | 3/2017 | Clifton | G11B 27/031 |
| 2018/0130496 A1* | 5/2018 | Mahapatra | G11B 27/28 |
| 2020/0242298 A1* | 7/2020 | Allen | G06F 40/103 |
| 2022/0005508 A1* | 1/2022 | Huang | G11B 27/031 |
| 2022/0028427 A1* | 1/2022 | Matsuda | G06F 3/04847 |

FOREIGN PATENT DOCUMENTS

| | | | |
|---|---|---|---|
| CN | 109801347 A | * | 5/2019 |
| CN | 109801347 A | | 5/2019 |
| CN | 110020137 A | | 7/2019 |
| CN | 110069758 A | | 7/2019 |
| CN | 10502734 A | | 11/2019 |
| CN | 110825912 A | | 2/2020 |
| CN | 111243632 A | | 6/2020 |
| CN | 111357277 A | * | 6/2020 |
| CN | 111357277 A | | 6/2020 |
| CN | 111460183 A | | 7/2020 |
| CN | 112073649 A | | 12/2020 |

OTHER PUBLICATIONS

ISA China Patent Office, International Search Report Issued in Application No. PCT/CN2021/114502, dated Nov. 19, 2021, WIPO, 6 pages.

China National Intellectual Property Administration, Notice of Grant Issued in Application No. 202010924421.9, dated Nov. 2, 2022, 4 pages.

Japan Patent Office, Office action issued in Japanese Application No. 2023-514968, dated Sep. 26, 2023, 9 pages.

Intellectual Property India, Office action issued in Indian Application No. 202327025532, dated Aug. 23, 2023, 9 pages.

* cited by examiner

ND RELATED# MULTIMEDIA DATA PROCESSING METHOD, MULTIMEDIA DATA GENERATION METHOD, AND RELATED DEVICE

CROSS REFERENCE TO RELATED APPLICATIONS

The present application is a continuation of International Patent Application No. PCT/CN2021/114502 filed on Aug. 25, 2021, which claims the priority to Chinese Patent Application No. 202010924421.9, titled "MULTIMEDIA DATA PROCESSING METHOD, MULTIMEDIA DATA GENERATION METHOD, AND RELATED DEVICE", filed on Sep. 4, 2020 with the Chinese Patent Office, both of which are incorporated herein by reference in their entireties.

FIELD

The present disclosure relates to the technical field of computers, and in particular to a method for processing multimedia data, a method for generating multimedia data, and related apparatuses.

BACKGROUND

At present, many video editing tools are provided on the market, providing various video editing functions to meet editing requirements of different users. However, due to the high requirements for performing operations based on the conventional video editing tools and the high requirements for the processing of terminals, the efficiency of video editing is very low. Thus, a large number of users cannot edit videos.

SUMMARY

The content part of the present disclosure is provided to introduce concepts in a brief form, and these concepts are to be described in detail in the following embodiments. The content of the present disclosure is not intended to identify the key features or essential features of the claimed technical solutions, nor is it intended to be used to limit the scope of the claimed technical solutions.

In a first aspect of the present disclosure, a method for processing multimedia data is provided. The method includes: obtaining multimedia data; displaying an editing page, where the editing page displays material data in the multimedia data; in response to a labeling operation performed on least one piece of material data, labeling the at least one piece of material data; and in response to a template generation instruction, removing the labeled material data from the multimedia data and generating a template.

In a second aspect of the present disclosure, a method for generating multimedia data is provided. The method includes: obtaining a template corresponding to currently browsed multimedia data; displaying a material import page, where the material import page displays editing information of material data to be imported in the template; receiving imported target material data; and in response to a generation instruction, generating target multimedia data based on the target material data and the template.

In a third aspect of the present disclosure, an apparatus for processing multimedia data is provided. The apparatus includes: a first obtaining module, a first displaying module, a labeling module, and a first generation module. The first obtaining module is configured to obtain multimedia data. The first displaying module is configured to display an editing page, where the editing page displays material data in the multimedia data. The labeling module is configure to, in response to a labeling operation performed on least one piece of material data, label the at least one piece of material data. The first generation module is configured to, in response to a template generation instruction, remove the labeled material data from the multimedia data and generate a template.

In a fourth aspect of the present disclosure, an apparatus for generating multimedia data is provided. The apparatus includes: a second obtaining module, a second displaying module, a receiving module, and a second generation module. The second obtaining module is configured to obtain a template corresponding to currently browsed multimedia data. The second displaying module is configured to display a material import page, where the material import page displays editing information of material data to be imported in the template. The receiving module is configured to receive imported target material data. The second generation module is configured to, in response to a generation instruction, generate target multimedia data based on the target material data and the template.

In a fifth aspect of the present disclosure, an electronic device is provided. The electronic device includes a memory and a processor. The memory stores a computer program. The processor is configured to perform, when executing the computer program, the method in the first aspect or the method in the second aspect.

In a sixth aspect of the present disclosure, a computer-readable medium is provided. The computer-readable medium stores a computer program. The computer program, when executed by a processor, causes the processor to perform the method in the first aspect or the method in the second aspect.

The following beneficial effects are achieved by the technical solutions according to the present disclosure.

(1) In the method and apparatus for processing multimedia data according to the present disclosure, after the multimedia data is obtained, an editing page is displayed. The editing page displays material data in the multimedia data. The user may label the material data on the editing page. When a template generation instruction is triggered, the labeled material data is removed from the multimedia data, and a template is generated. According to the embodiments of the present disclosure, the material data in the obtained multimedia data is directly labeled, and the template is generated after removing the labeled material data, reducing the operation steps of the user in generating a template, improving the efficiency of generating a template, reducing the requirements for the terminal to process multimedia data, adapting to the different requirements of the users, generating multiple types of templates, and improving the conversion rate of templates.

(2) In the method and apparatus for generating multimedia data according to the present disclosure, after a template corresponding to currently browsed multimedia data is obtained, a material import page is display. The material import page displays editing information of material data to be imported in the template. The user may import the target material data in the material import page. When a generation instruction is triggered, target multimedia data is generated based on the target material data and the template. According to the embodiments of the present disclosure, the target multimedia data may be generated directly based on the template corresponding to the multimedia data and the imported target material data, reducing the operation steps for the user in generating target multimedia data, improving the efficiency of generating target multimedia data, facilitating the user's operations, reducing the requirements for the terminal to process multimedia data, improving the efficiency and quantity of target multimedia data editing based on templates, and improving the user's operating experience.

BRIEF DESCRIPTION OF THE DRAWINGS

The above and other features, advantages and aspects of the embodiments of the present disclosure will be more apparent in conjunction with the accompanying drawings and with reference to the following embodiments. Throughout the drawings, the same or similar reference numerals represent the same or similar elements. It should be understood that the drawings are schematic and the originals and elements are unnecessarily drawn to scale.

DETAILED DESCRIPTION OF THE EMBODIMENTS

The embodiments of the present disclosure are described in detail below with reference to the accompanying drawings. Although the drawings show some embodiments of the present disclosure, it should be understood that the present disclosure can be implemented in various forms and is not limited to the embodiments. The embodiments are provided for a more thorough and complete understanding of the present disclosure. It should be understood that the drawings and the embodiments in the present disclosure are only illustrative of the disclosure, and are not intended to limit the protection scope of the present disclosure.

It should be understood that the steps of the method according to the embodiments of the present disclosure may be performed in different orders, and/or be performed in parallel. In addition, the method embodiments may include additional steps and/or omit to perform the illustrated steps, not limiting the scope of the present disclosure.

The term "including" and its variants as used herein are open-ended includes, that is, "including but not limited to". The term "based on" means "based at least in part on." The term "one embodiment" means "at least one embodiment". The term "another embodiment" means "at least one additional embodiment". The term "some embodiments" means "at least some embodiments". Definitions of other terms are provided in the following description.

It should be noted that, the terms "first" "second" and so on mentioned in the present disclosure are only used to distinguishing different apparatuses, modules or units, rather than limit an order of functions performed by the apparatus, module or unit or limit interdependence.

It should be noted that, the terms "one" and "multiple" mentioned in the present disclosure are schematic rather than restrictive, and should be understood as "one or more" by those skilled in the art, otherwise explicitly illustrated in the context.

The names of messages or information exchanged between multiple devices in the embodiments of the present disclosure are only illustrative, and are not intended to limit the scope of the messages or information.

In order to make the purpose, technical solutions and advantages of the present disclosure more clear, the embodiments in the present disclosure are to be further described in detail in combination with the accompanying drawings.

The technical solutions in the present disclosure and how to solve the above technical problems by using the technical solutions in the present disclosure are described in detail below with specific embodiments. The following embodiments may be combined with each other, and the same or similar concepts or processes may not be repeated in some embodiments. The embodiments of the present disclosure are described below in combination with the accompanying drawings.

Figure 1:
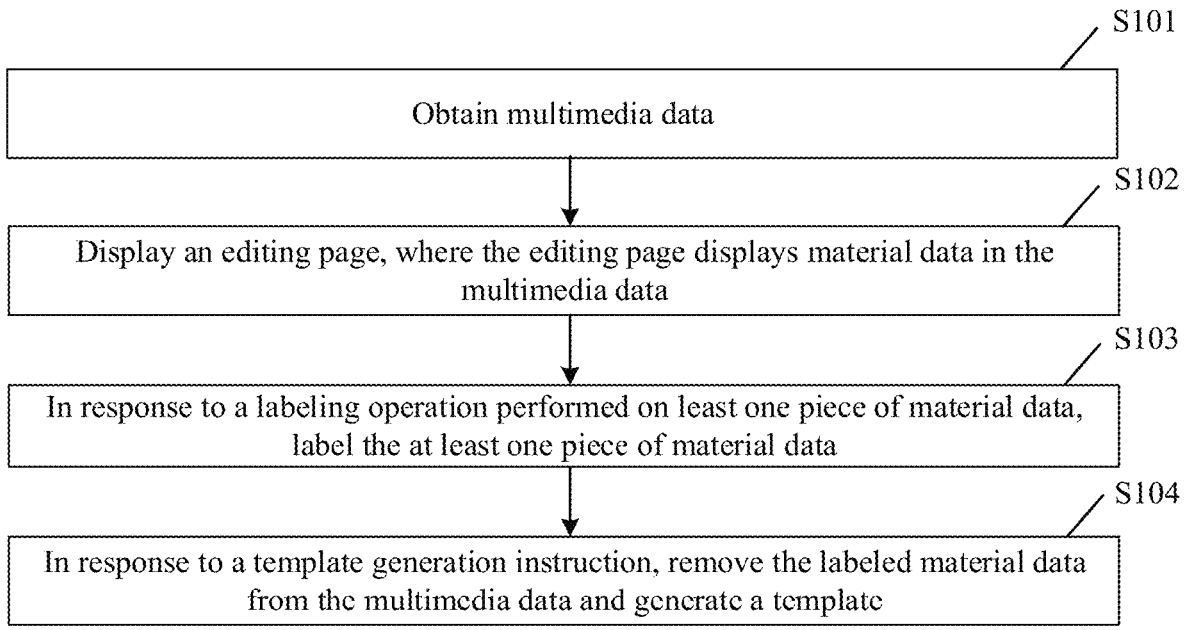
FIG. 1 is a flow chart of a method for processing multimedia data according to an embodiment of the present disclosure.

A method for processing multimedia data is provided according to the present disclosure. The method may be performed by an electronic device according to an embodiment of the present disclosure. Specifically, the electronic device may be any device supporting interface interaction, such as a mobile terminal and a personal computer (PC). The user uses an electronic device to log in to a web client or an application client to process multimedia data. The multimedia data may include multiple pieces of material data (such as material data including one of video data, picture data, text data and audio data or a combination thereof). The multimedia data may further include editing information associated with the material data. In the embodiments of the present disclosure, a template and target multimedia data are all multimedia data. Specifically, referring to FIG. 1, a method for processing multimedia data according to the present disclosure includes the following steps S101 to S104.

In step S101, multimedia data is obtained.

In an embodiment, the obtained multimedia data may include data previously stored in a terminal or a server, or data obtained by various editing operations performed by a terminal or a server. The obtained multimedia data may further include multimedia data edited by the user.

In an embodiment, after the user edits and generates multimedia data, in addition to storing the multimedia data in the terminal or publishing the multimedia data, the currently edited multimedia data may be converted to multimedia data for generating a template by generating a template instruction.

In step S102, an editing page is displayed. The editing page displays material data in the multimedia data.

In an embodiment, the editing page displays based on currently obtained multimedia data. Specifically, the editing page displays one or more pieces of material data in the multimedia data. On the editing page, the user may label the displayed material data.

In an embodiment, each piece of material data includes at least one of video data, text information data, audio data, picture data and the like in the multimedia data.

In step S103, in response to a labeling operation performed on least one piece of material data, the at least one piece of material data is labeled.

In an embodiment, the user may select at least one piece of material data for labeling, and the labeled material data is in a labeled state. The material data in the labeled state is replaceable material data. In editing target multimedia data based on a template generated by using the multimedia data, it is required to import material data in a case that the labeled material data is empty.

In an embodiment, in displaying the editing page, all material data may be configured in a labeled state by default.

The user may cancel the labeling of any material data. That is, all the material data displayed on the editing page are labeled as replaceable material data. After the user cancels the labeling of any material data, the labeling of the material data is canceled. When the user triggers a next operation, it indicates that a labeling state of a current material data is determined.

In step S104, in response to a template generation instruction, the labeled material data is removed from the multimedia data, and a template is generated.

In an embodiment, on receiving a template generation instruction, it indicates that the user has adjusted the multimedia data. Then, the material data in the labeled state in step S103 is removed from the multimedia data, and a template is generated based on the multimedia data after the labeled material data is removed. Specifically, in step S103, the user labels the material data through an interaction layer (UI layer). In generating the template in step S104, a logic layer removes the labeled material data from the multimedia data.

In an embodiment of the present disclosure, the removing operation includes at least one of a deleting operation and an operation of changing an original attribute of material data. For different types of material data, different operations are performed.

In an embodiment of the present disclosure, the method for processing multimedia data is mainly applied to a scenario in which the user generates a template. By providing the user with the channels (functions) for generating a template, the number of templates can be greatly increased and the styles of templates can be enriched, meeting various requirements of the users for performing video editing, and improving the conversion rate of templates and the user's experience.

Figure 2:
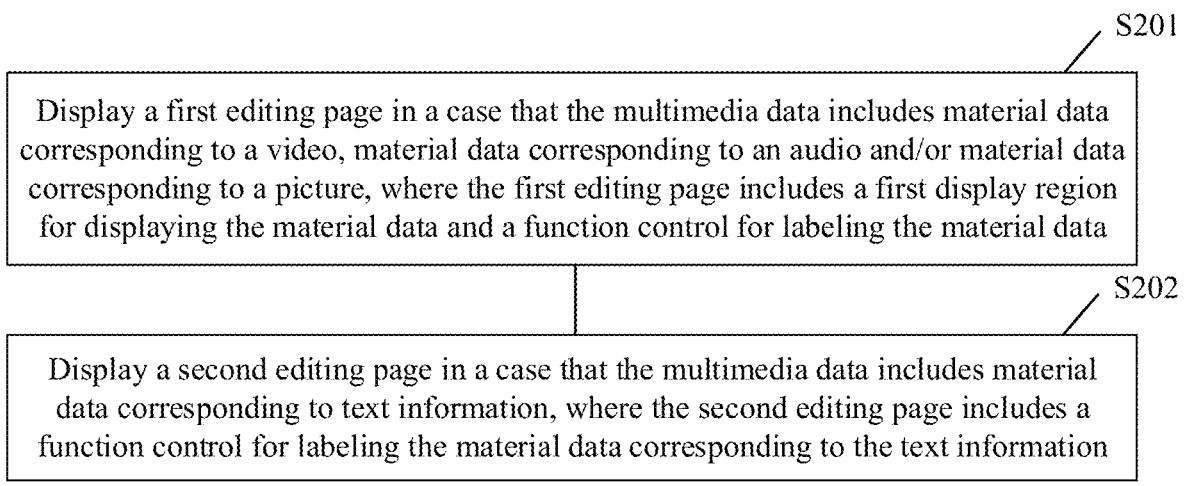
FIG. 2 is a flow chart of a method for processing multimedia data according to an embodiment of the present disclosure.
Figure 11A:
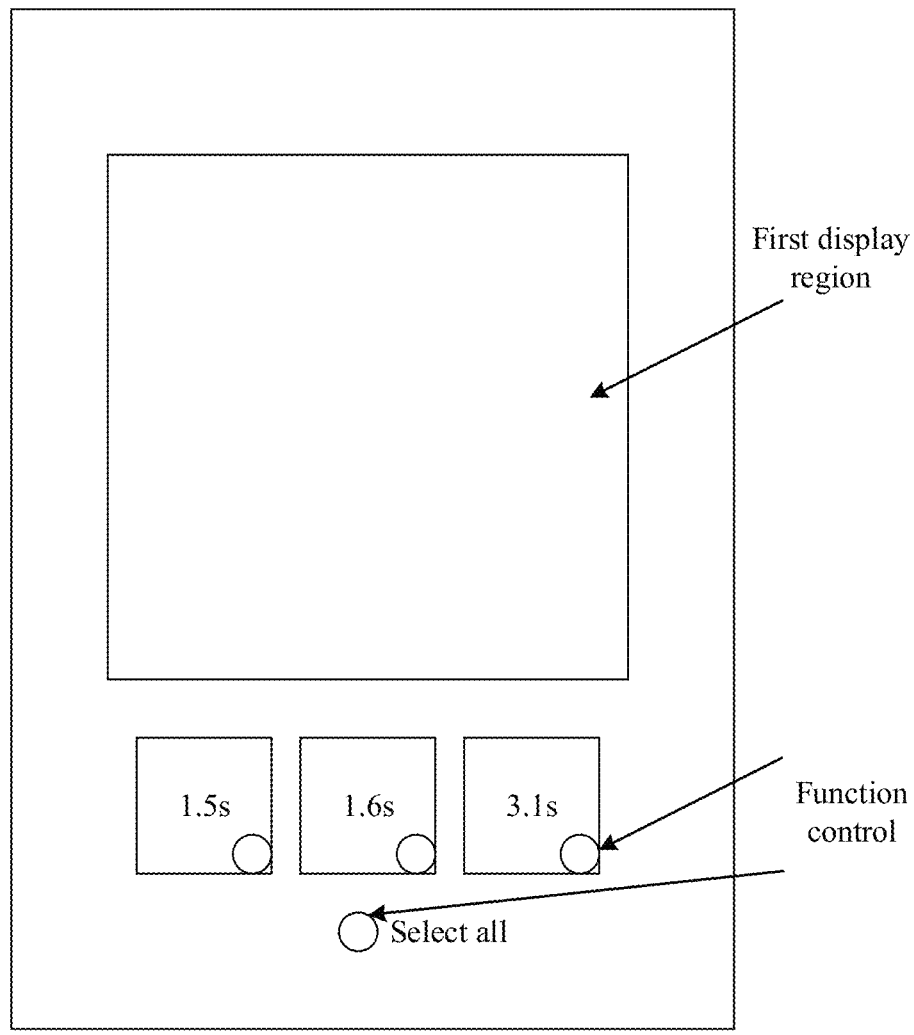
FIG. 11a is a schematic diagram of a first editing page in a method for processing multimedia data according to an embodiment of the present disclosure.
Figure 11B:
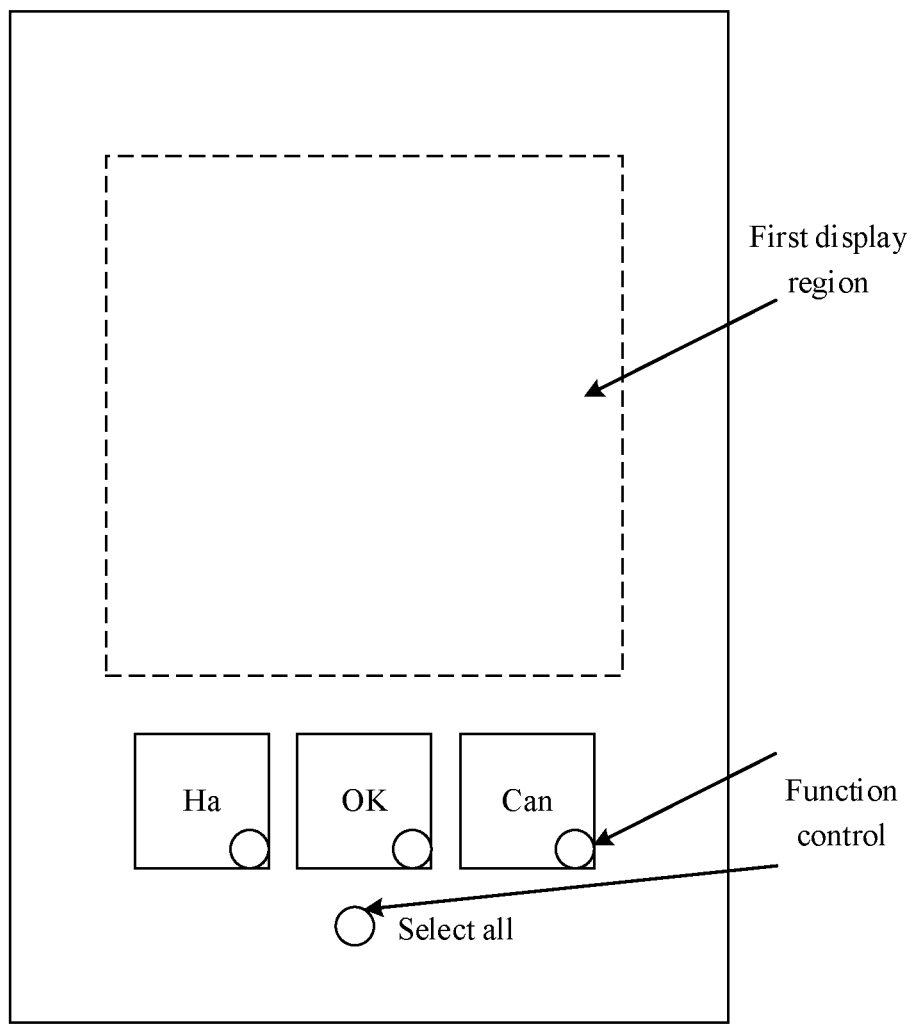
FIG. 11b is a schematic diagram of a second editing page in a method for processing multimedia data according to an embodiment of the present disclosure.

Based on the contents shown in FIG. 2, FIG. 11a and FIG. 11b, the operation of displaying an editing page in step S102 includes at least one of the following steps S201 and S202.

In step S201, a first editing page is displayed in a case that the multimedia data includes material data corresponding to a video, material data corresponding to an audio and/or material data corresponding to a picture. The first editing page includes a first displaying region for displaying the material data and a function control for labeling the material data (as shown in FIG. 11a).

In an embodiment, the material data corresponding to the video, the audio and/or the picture included in the multimedia data are displayed in a same page. In a case that there are more than one piece of material data required to be displayed in the first editing page, the first displaying region displays the material data in sequence. For example, in a case that two pieces of video data and one piece of audio data are required to be displayed, the video data and the audio data are displayed in sequence based on playing instants of the material data in the multimedia data.

In an embodiment, in order to facilitate the user viewing and labeling the material data, it may be configured that one function control corresponds to one piece of material data. In a case that the multimedia data includes two pieces of material data, there are two corresponding function controls. In an embodiment, a function control for labeling material data is displayed below the first displaying region. The function control may be arranged at another position, which is not limited in the embodiments of the present disclosure.

In an embodiment, a functional control for labeling material data may displays editing information of the material data. The editing information indicates an editing result of material data by the user (for example, a variable speed processing performed on video data to play the video data at twice an original playback speed, thus the time length of the material data is shortened). For example, in a case that the material data includes video data, a function control may display a playing time length of the video data in the multimedia data.

In step S202, a second editing page is displayed in a case that the multimedia data includes material data corresponding to text information. The second editing page includes a function control for labeling the material data corresponding to the text information (as shown in FIG. 11b).

In an embodiment, in a case that the multimedia data includes material data corresponding to text information, a separate page, that is, a second editing page, may be displayed. The second editing page includes a function control for labeling material data. The function control may display text information of the material data. Specifically, in order to facilitate the user viewing and labeling material data, it may be configured that a function control corresponds to one piece of text information. For a function control, corresponding text information may be displayed in at least one of the following two manners. In a first manner, in a case that the number of characters included in the text information is less than or equal to the preset number of characters, all the characters in the text information are displayed on the function control (for example, in a case that text information is "好的" (which is "good" in English) and the preset number of Chinese characters is 5, the Chinese characters "好的" are directly displayed on the function control). In a second manner, in a case that the number of characters included in the text information is greater than the preset number of characters, a first character in the text information is displayed on the function control (for example, in a case that the text information is "可以在下雨天撑伞" (which is "One may held an umbrella in rainy days" in English) and the preset number of Chinese characters is 5, the Chinese character "可" is displayed on the function control). In addition, text information may be superimposed on a video frame played at a same time instant for display. The detail display manners are not limited in the present disclosure.

In an embodiment, the second editing page may include a first displaying region, and the first displaying region is configured to display other material data played at a same time instant as the text information. For example, material data corresponding to a time instant of 2th second includes text information and first video data, superimposed data of the first video data and the text information is displayed in the first displaying region of the second editing page.

In an embodiment, the material data corresponding to the video, the audio, the picture and/or the text information included in the multimedia data may be displayed in a same page. That is, the editing page includes a first displaying region and function controls for labeling various material data.

In an embodiment, as shown in FIGS. 11a and 11b, interaction of a function control may be performed by at least one of: (1) touching any position of a square region (in a case that the function control is displayed in a square) to label corresponding material data, and displaying labeling information in a circular region in the square region; (2) touching a circular region (in a case that the function control is displayed in a circle) in a square region to label corresponding material data, and displaying labeling information in the circular region; and (3) touching a circular region (in a case that a function control for labeling all material data is displayed in a circle) corresponding to a select all function, labeling all material data, and displaying labeling information in all circular regions.

The labeling information may be displayed in the circular region by displaying a symbol "✓" in the circular region or by filling the circular region with a preset color, which is not limited in the present disclosure.

Figure 3:
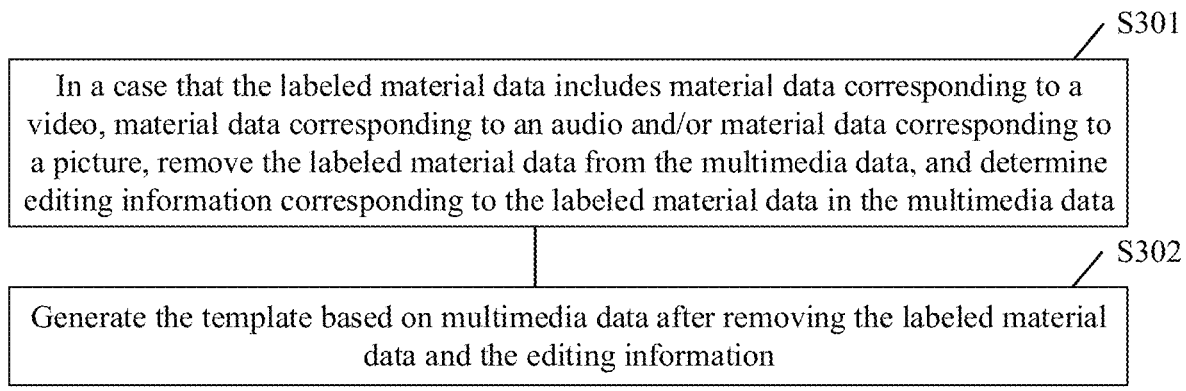
FIG. 3 is a flow chart of a method for processing multimedia data according to an embodiment of the present disclosure.

In an embodiment, as shown in FIG. 3, the operations of removing the labeled material data from the multimedia data and generating a template in step S104 includes the following steps S301 and S302.

In step S301, in a case that the labeled material data includes material data corresponding to a video, material data corresponding to an audio and/or material data corresponding to a picture, the labeled material data is removed from the multimedia data, and editing information corresponding to the labeled material data in the multimedia data is determined.

In step S302, the template is generated based on multimedia data after removing the labeled material data and the editing information.

Specifically, after the user labels the material data in the interaction layer (UI layer) in step S103, in generating the template in step S104, the logic layer removes the labeled material data from the multimedia data, and writes information corresponding to the labeled material data in a description file corresponding to the template, such as writing the labeled material data, in a form of an array, in the description file corresponding to the template.

In an embodiment, the editing information indicates attributes of the material data, and includes information about at least one of a time length, a sorting position, a size, a resolution, and an audio attribute of the material data. The time length is a playing time length of the material data in the multimedia data. The sorting position indicates a playing order of the material data in the multimedia data. The size is a size of the material data being displayed. The resolution is an adapted resolution of the material data being edited in the multimedia data. The audio attribute include information about whether background music exists in editing the material data in the multimedia data and information about a volume of the background music. The editing information may further indicate an editing result of the user editing the multimedia data. For example, a time length of an original imported to-be-edited video data is 3 seconds, after the user edits the video data for obtaining multimedia data, a time length of the video data is 1.2 seconds, that is, the editing information of the video data includes information indicating a time length of 1.2 seconds. In an embodiment, compared with the multimedia data, the template does not include the labeled material data and includes the editing information corresponding to the labeled material data.

In an embodiment, the editing information further includes information about related functions used in performing editing based on material data. The related functions include but are not limited to: a special effect function, a sticker function, a filter function, a picture-in-picture function and a transition function. For example, in a case that a special effect named "Dream" is added to a piece of material data, the editing information includes information about the name of the special effect.

In an embodiment, the operation of removing in step S301 may be understood as an operation of deleting.

In an embodiment, the operations of removing the labeled material data from the multimedia data and generating a template in step S104 include: in a case that the labeled material data includes material data corresponding to text information, configuring the material data corresponding to the text information as editable data; and generating the template based on multimedia data after configuring the editable data.

In an embodiment, in a case that the labeled material data includes material data corresponding to text information, since the text information is convenient to express a theme of the multimedia data, in adjusting the multimedia data, the material data corresponding to the text information is configured as editable data rather than deleting the material data. Then, the user may edit the original text information in editing target multimedia data based on the template. That is, the template includes the material data corresponding to the labeled text information, and the material data is configured as editable data.

In an embodiment, the operation of configuring the material data as editable data may be understood as an operation of changing the original attribute of the material data in the operation of removing.

Figure 4:
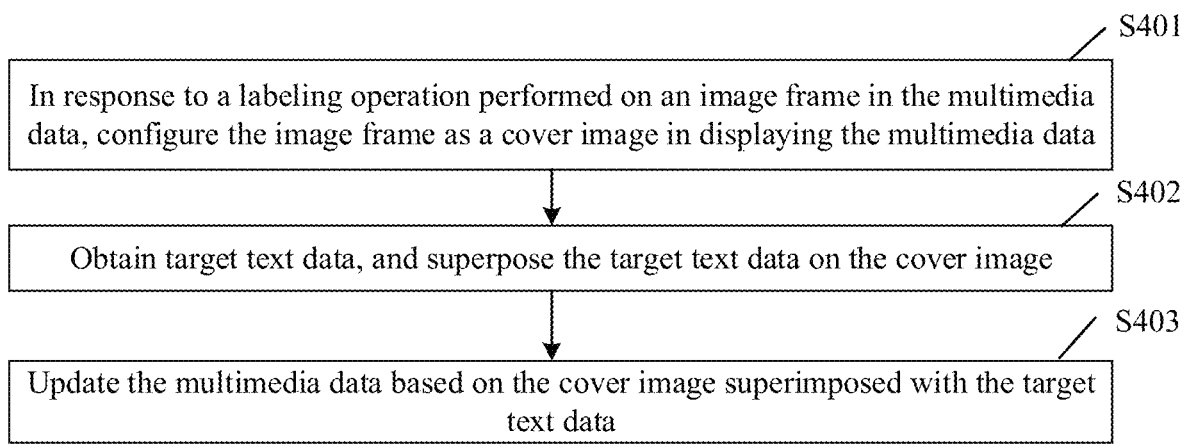
FIG. 4 is a flow chart of a method for processing multimedia data according to an embodiment of the present disclosure.

In an embodiment, as shown in FIG. 4, the method according to the present disclosure further includes the following steps S401 to S403.

In step S401, in response to a labeling operation performed on an image frame in the multimedia data, the image frame is configured as a cover image in displaying the multimedia data.

Specifically, the processing of the multimedia data further includes configuring a cover image when displaying the multimedia data. The cover image may be an image frame in the multimedia data, which is labeled by the user or labeled by default.

In an embodiment, as shown in FIG. 4, after the operation of configuring the image frame as the cover image in displaying the multimedia data in step S401, the method further includes the following steps.

In step S402, target text data is obtained, and the target text data is superposed on the cover image.

In step S403, the multimedia data is updated based on the cover image superimposed with the target text data.

In an embodiment, in displaying the multimedia data, the target text data displayed on the cover may be displayed to introduce a template corresponding to the multimedia data, facilitating the user knowing features of the template corresponding to the multimedia data when browsing the multimedia data, improving the user's use of the template corresponding to the multimedia data, and thereby improving the conversion rate of the template.

In an embodiment, the obtained target text data is displayed, as a floating layer, with the multimedia data. That is, the target text data may be displayed while playing the multimedia data. The user may watch the multimedia data and understand information, such as effects and features, of the multimedia data simultaneously, improving the user's willingness to make target multimedia data based on the template corresponding to the multimedia data.

In an embodiment, the multimedia data is obtained by performing one of the following two operations.

For a first operation, multimedia data generated by performing an editing operation based on at least one of currently captured material data and pre-stored material data is obtained.

Specifically, the obtained multimedia data may be data obtained by performing an editing operation by the user based on the original material data. For example, the user imports currently captured video data, edits the video data (such as adjusting a playback speed, adding a mask, and performing a chroma matting), and/or adds multimedia data, generated by performing a special effect function, a sticker function, a filter function, a picture-in-picture function, a transition function, text information, image information, background music and the like, on the video data.

For a second operation, multimedia data generated by performing an editing operation based on a template is obtained.

Specifically, in order to improve the efficiency of making multimedia data, the user may perform an editing operation based on a currently obtained template to generate multimedia data (the user may import material data and edit the material data, such as adjusting a playing speed and adding a filter, to enrich the diversity of the multimedia data).

In an embodiment, after the operations of removing the labeled material data from the multimedia data and generating a template in step S104, the method further includes: saving and/or publishing the multimedia data and the template. The publishing the multimedia data and the template includes: uploading the multimedia data and the template to a server.

Specifically, after the multimedia data is published, the user may browse the multimedia data, pushing by a server, by using a terminal. Accordingly, when the user obtains a corresponding template based on currently browsed multimedia data to edit target multimedia data, the server distributes the template.

In the method for processing multimedia data according to the present disclosure, after the multimedia data is obtained, an editing page is displayed. The editing page displays material data in the multimedia data. The user may label the material data on the editing page. On receiving a template generation instruction, the terminal device may remove the labeled material data from the multimedia data and generate a template. According to the embodiments of the present disclosure, based on the obtained multimedia data, material data is directly labeled and removed, and then the template is generated, reducing the operation steps of the user in generating a template, improving the efficiency of generating a template, reducing the requirements for the terminal device to process multimedia data, adapting to the different requirements of the users, and improving the conversion rate of templates.

Figure 5:
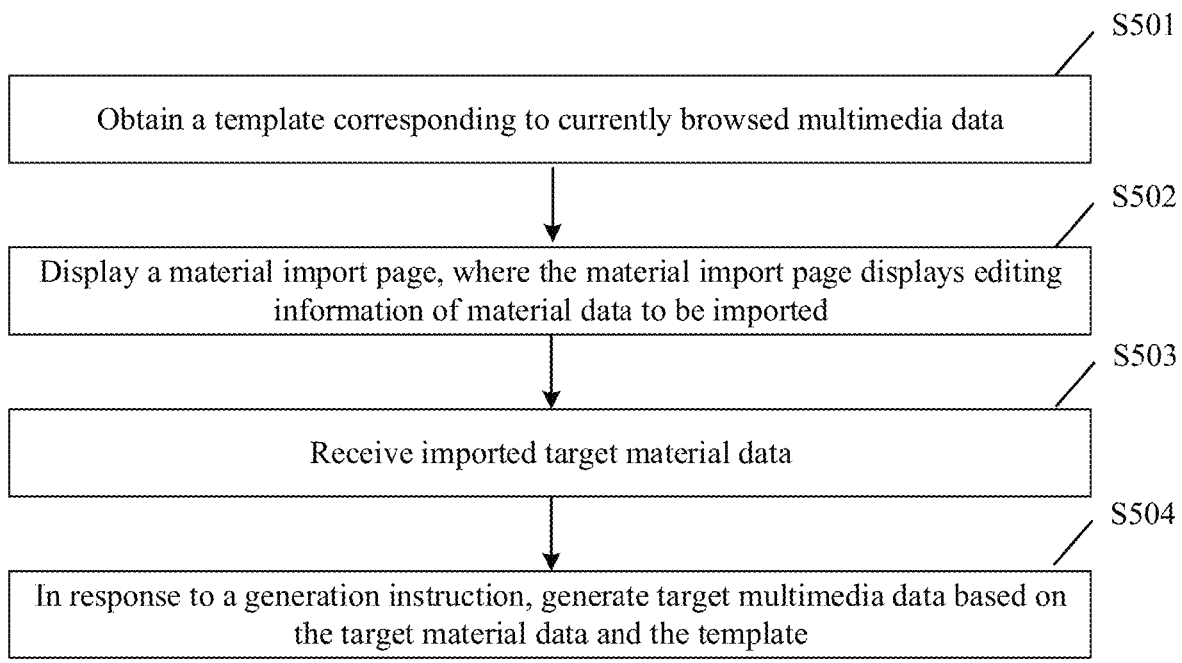
FIG. 5 is a flow chart of a method for generating multimedia data according to an embodiment of the present disclosure.

Based on the same inventive concept, as shown in FIG. 5, a method for generating multimedia data is provided according to an embodiment of the present disclosure. The method is applied to an application scenario in which target multimedia data is generated based on a template. Specifically, the method includes the following steps S501 to S504.

In step S501, a template corresponding to currently browsed multimedia data is obtained.

In an embodiment, a server pushes stored multimedia data to the users. In displaying the multimedia data pushed by the server, the multimedia data may be displayed as a template unit. Alternatively, multimedia data including different contents may be defined as different types of multimedia data based on features of the contents of the multimedia data, and then the different types of multimedia data is displayed in different types of template units (such as a food template unit, a cute pet template unit, a travel template unit and other types of template units). The user may brows multimedia data with different types of template units according to requirements for editing multimedia data. On receiving an editing instruction triggered by the user for a piece of multimedia data, the terminal device obtains a corresponding template based on the currently browsed multimedia data. The corresponding template may be obtained by performing the following operations. Based on the multimedia data, a request is transmitted to the server for obtaining a corresponding template. Then, the server transmits the corresponding template to a client.

In step S502, a material import page is displaying. The material import page displays editing information of material data to be imported in the template.

Specifically, the material import page displays editing information of material data to be imported in the template. The editing information of the material data to be imported is editing information corresponding to material data labeled as replaceable material data by the user who made a template before publishing the template. In an embodiment, the editing information includes information indicating at least one of a time length, a sorting position, a size, a resolution, and an audio attribute of the material data to be imported.

In an embodiment, based on the method for processing multimedia data described above, the editing information of the material data to be imported is the editing information corresponding to the labeled material data removed from the multimedia data in the method for processing multimedia data.

In step S503, imported target material data is received.

In an embodiment, displaying the editing information is conducive to guiding the user to select imported target material data. For example, in a case that current material data to be imported is video data, the displayed editing information includes a time length and a sorting position of each of video data segments. The user may select material data from the pre-stored material data based on the editing information and import the selected material data, or may capture material data based on the editing information and import the captured material data.

In an embodiment, the quantity and order of the imported target material data are consistent with the quantity and playing order of the material data to be imported in the template. In a case that the quantity of the imported target material data does not match the quantity of the material data to be imported in the template, prompt information may be transmitted, so that the user performs an adjustment to better fit the effect of the multimedia data corresponding to the template.

In step S504, in response to a generation instruction, target multimedia data is generated based on the target material data and the template.

In an embodiment, in response to a generation instruction, the target material data and the template are fused to obtain target multimedia data. It should be understood that by replacing currently imported target material data with material data at a corresponding position in currently browsed multimedia data, target multimedia data with similar presentation effect as the currently browsed multimedia data is obtained.

Specifically, in making the target multimedia data based on the selected template, after the user imports the target material data, the terminal fills the target material data in a description file of the template based on an identifier of the target material data and an identifier in an array corresponding to the labeled material data in the description file, so that a complete file restoration is performed to fuse the target material data imported by the user with the effect of the template to generate the target multimedia data.

The method for generating multimedia data according to the embodiments of the present disclosure is mainly applied to a scenario in which the user edit target multimedia data based on a template. With the method, the target material data is imported, and the target multimedia data with similar presentation effect to the currently browsed multimedia data is generated based on the template corresponding to the currently browsed multimedia data, reducing the difficulty for the user to edit target multimedia data, improving the quantity and efficiency of the target multimedia data released by the user, and thereby improving the user's operation experience.

Figure 6:
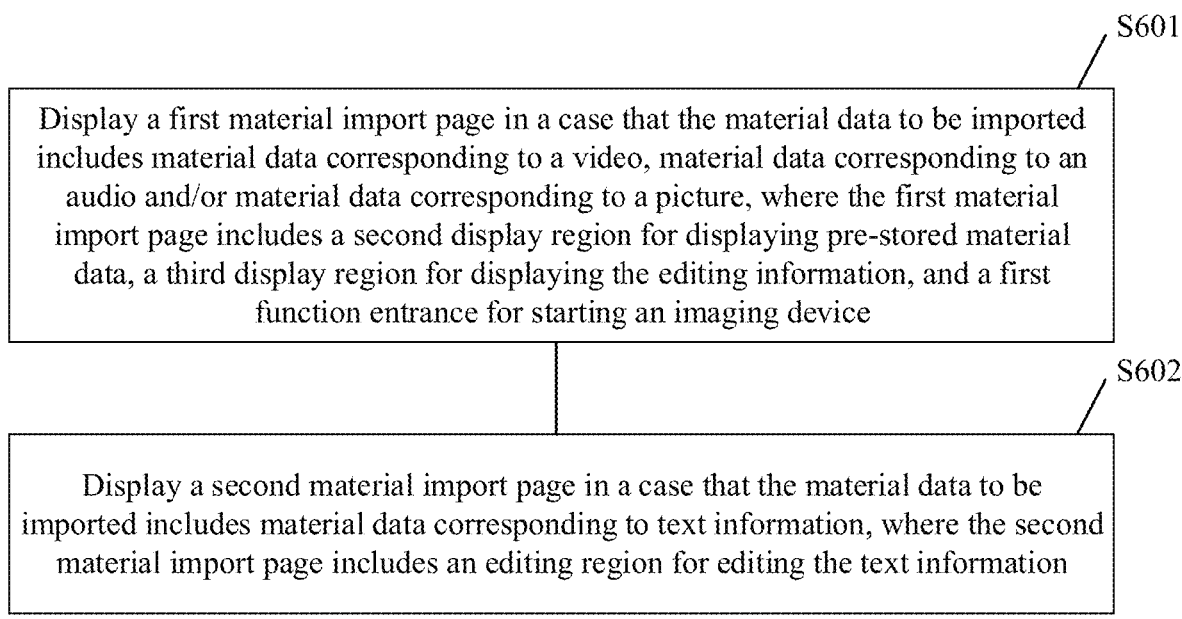
FIG. 6 is a flow chart of a method for generating multimedia data according to an embodiment of the present disclosure.

In an embodiment, as shown in FIG. 6, the operation of displaying a material import page in step S502 includes at least one of the following steps S601 and S602.

In step S601, in a case that the material data to be imported includes material data corresponding to a video, material data corresponding to an audio and/or material data corresponding to a picture, a first material import page is displayed. The first material import page includes a second displaying region for displaying pre-stored material data, a third displaying region for displaying the editing information, and a first function entrance for starting an imaging device.

Figure 12:
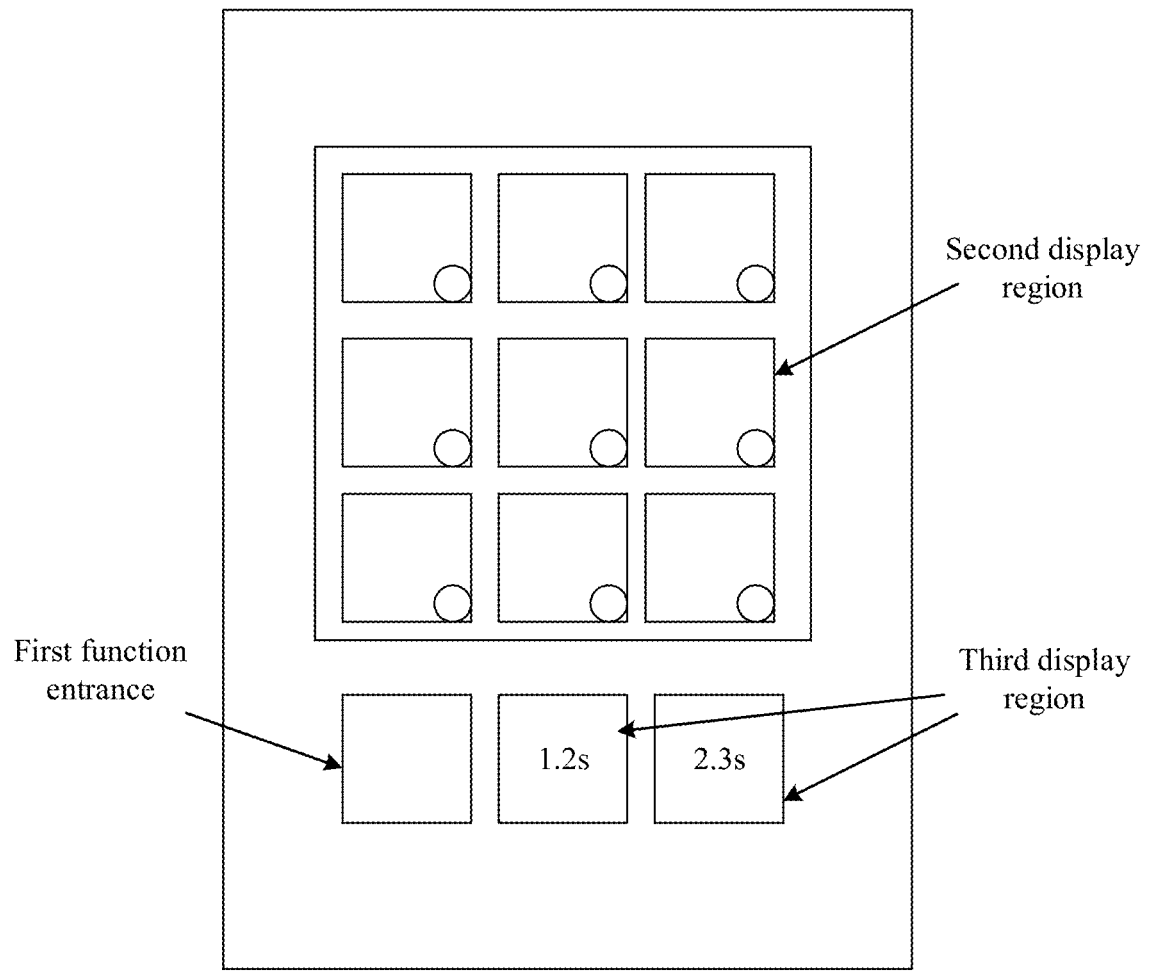
FIG. 12 is a schematic diagram of a first material import page in a method for generating multimedia data according to an embodiment of the present disclosure.

In an embodiment, as shown in FIG. 12, in a case that the material data to be imported includes material data corresponding to a video, material data corresponding to an audio and/or material data corresponding to a picture, that is, in a case that the material data currently required to be imported by the user includes the material data corresponding to a video, the material data corresponding to an audio and/or the material data corresponding to a picture, the first material import page is displayed. The first material import page includes a second displaying region for displaying pre-stored material data, a third displaying region for displaying the editing information, and a first function entrance for starting an imaging device. For the content to be displayed in the second displaying region, based on the type of material data required to be imported, the corresponding type of material data currently stored in the terminal is display. For example, in a case that the material data currently required to be imported is video data, video data currently stored in the terminal is displayed. In an embodiment, based on time instants at which the terminal stores video data, the video data is displayed in an order from a nearest time instant to a farthest time instant, so that the user may quickly select material data wanted to be imported by the user. For the third displaying region, before the target material data is imported, the third displaying region displays editing information (such as length information of 1.2 seconds and 2.3 seconds of material). After the target material data is imported, the third displaying region displays the cover data of the imported target material data or the cover data and the editing information of the imported target material data (where the displayed cover data may be an image frame). The first function entrance may be configured to start an imaging device to capture material data for import.

As shown in FIG. 12, the second displaying region includes multiple function controls for labeling pre-stored material data. Each of the function controls corresponds to a segment of pre-stored material data. Specifically, the interaction of the functional control may refer to the interaction of the functional control shown in FIG. 11a and FIG. 11b, and is not repeated herein.

In step S602, in a case that the material data to be imported includes material data corresponding to text information, a second material import page is displayed. The second material import page includes an editing region for editing the text information.

In an embodiment, the editing information displayed on the second material import page may be configured as text information of editable data, and the user may edit the text information in the editing region.

Figure 7:
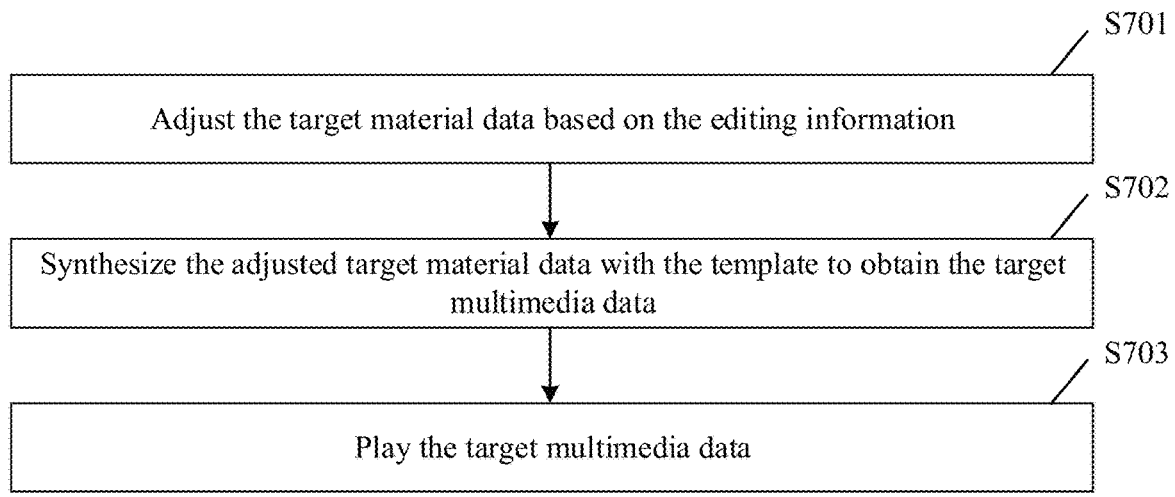
FIG. 7 is a flow chart of a method for generating multimedia data according to an embodiment of the present disclosure.

Hereinafter, in combination with FIG. 7, the operation of generating target multimedia data based on the target material data and the template in response to a generation instruction in step S504 is described. The step S504 includes the following steps S701 to S703.

In step S701, the target material data is adjusted based on the editing information.

In an embodiment of the present disclosure, considering that the currently imported target material data is not adapted to the configuration of the material data to be imported, after the user imports any target material data, the terminal adjusts the target material data based on the editing information to adapt the target material data to be adapted to the configuration of the material data to be imported. With the embodiments of the present disclosure, the convenience of the user editing the target multimedia data based on a template is improved.

In step S702, the adjusted target material data is synthesized with the template to obtain the target multimedia data.

In step S703, the target multimedia data is played.

In an embodiment, after the adjusted target material data is synthesized with the template to obtain the target multimedia data, the target multimedia data may be played, facilitating the user previewing and adjusting the initially synthesized target multimedia data.

In an embodiment, the editing information includes at least one of: a time length of the material data to be imported, an audio attribute of the material data to be imported, and a resolution of the material data to be imported.

In an embodiment, in a case that the target material data includes target video data, the target material data is adjusted based on the editing information by performing at least one of the following steps S1 to S4.

In step S1, based on the time length of the material data to be imported, a content corresponding to the time length is intercepted from the target video data.

Specifically, in a case that the time length of the material data to be imported is greater than the time length of the target video data in the target material data, based on the time length of the material data to be imported, a content corresponding to the time length is intercepted from the target video data. For example, assuming that the time length of the material data to be imported is 3s and the time length of the target video data in the target material data is 8 s, a content with a time interval of 3 s (such as, a content with a time length ranging from 0 s to 3 s) or a content with a time length of 3 s is randomly intercepted from the target video data.

In step S2, a playback speed of the target video data is adjusted, so that a playback time length of the target video data is compatible with the time length of the material data to be imported.

Specifically, in a case that the playback time length of the target video data is different from the time length of the material data to be imported, the playback time length of the target video data may be adjusted by adjusting (for example, speeding up or slowing down) the playback speed of the target video data, so that the playback time length of the target video data is the same as the time length of the material data to be imported. For example, assuming that the time length of the material data to be imported is 3 s and a playback time length of currently imported target video data is 5 s, the playback speed of the target video data may be adjusted by changing speed or curvedly changing speed, and then the playback time length of the target video data may be adjusted to 3 s.

In step S3, audio data in the target video data is adjusted based on the audio attribute. The adjustment of the audio data includes but is not limited to: deleting the audio data from the target video data, and adjusting a playback volume of the audio data in the target video data.

Specifically, background music is generally set in the multimedia data corresponding to the template. The target video data imported by the user is generally captured by the user. When the user captures the target video data, there may be some environmental noise or music is played according to capturing requirement, so that the imported target video data includes multiple frames of image data and audio data. Thus, in playing, the background music in the target video data imported by the user conflicts with the background music in the template. To solve the above technical problem, the audio data in the target video data may be processed based on the audio attribute indicated in the editing information. In an embodiment, in a case that the audio attribute indicated in the editing information is empty (such as, null), the audio data in the target video data is deleted. In a case that the audio attribute indicated in the editing information is a volume value, the playback volume of the audio data in the target video data is adjusted based on the volume value (for example, assuming that a maximum volume value is 100 decibel (dB) and the volume value indicated in the editing information is 37 decibel, if an original playback volume value of the audio data is 100 decibel, the playback volume of the audio data is reduced to 37 decibel).

In step S4, a resolution of the target video data is adjusted to adapt to the resolution of the material data to be imported.

Specifically, resolutions of videos captured by different devices are generally different. To ensure the consistency of the display effect, the resolution of the target video data may be adjusted based on the resolution indicated in the editing information. Generally, in a case that the resolution of the target video data is too high, the resolution of the target video data is compressed.

In an embodiment, the editing information includes at least one of: a size of the material data to be imported and a resolution of the material data to be imported.

In an embodiment, in a case that the target material data includes target picture data, the target material data is adjusted based on the editing information by performing at least one of the following steps A1 and A2.

In step A1, a size of the target picture data is adjusted based on the size of the material data to be imported.

Specifically, the size of the target picture data is adjusted by, but not limited to, cutting or scaling. For example, assuming that a target picture size of the target material data is 540 mm*360 mm and the editing information of the material data to be imported indicates that the size of the picture material data currently required to be imported is 455 mm*322 mm, the target material data is cut or reduced based on the editing information, that is, the size of the target material data is adjusted to be consistent with the size of 455 mm*322 mm or to be consistent with a proportion of the size of 455 mm*322 mm.

In step A2, a resolution of the target picture data is adjusted to adapt to the resolution of the material data to be imported.

Specifically, resolutions of pictures captured by different devices are generally different. In order to ensure the consistency of the display effect, the resolution of the target image data may be adjusted based on the resolution indicated in the editing information. Generally, in a case that the resolution of the target picture data is too high, the resolution of the target picture data is compressed.

Figure 8:
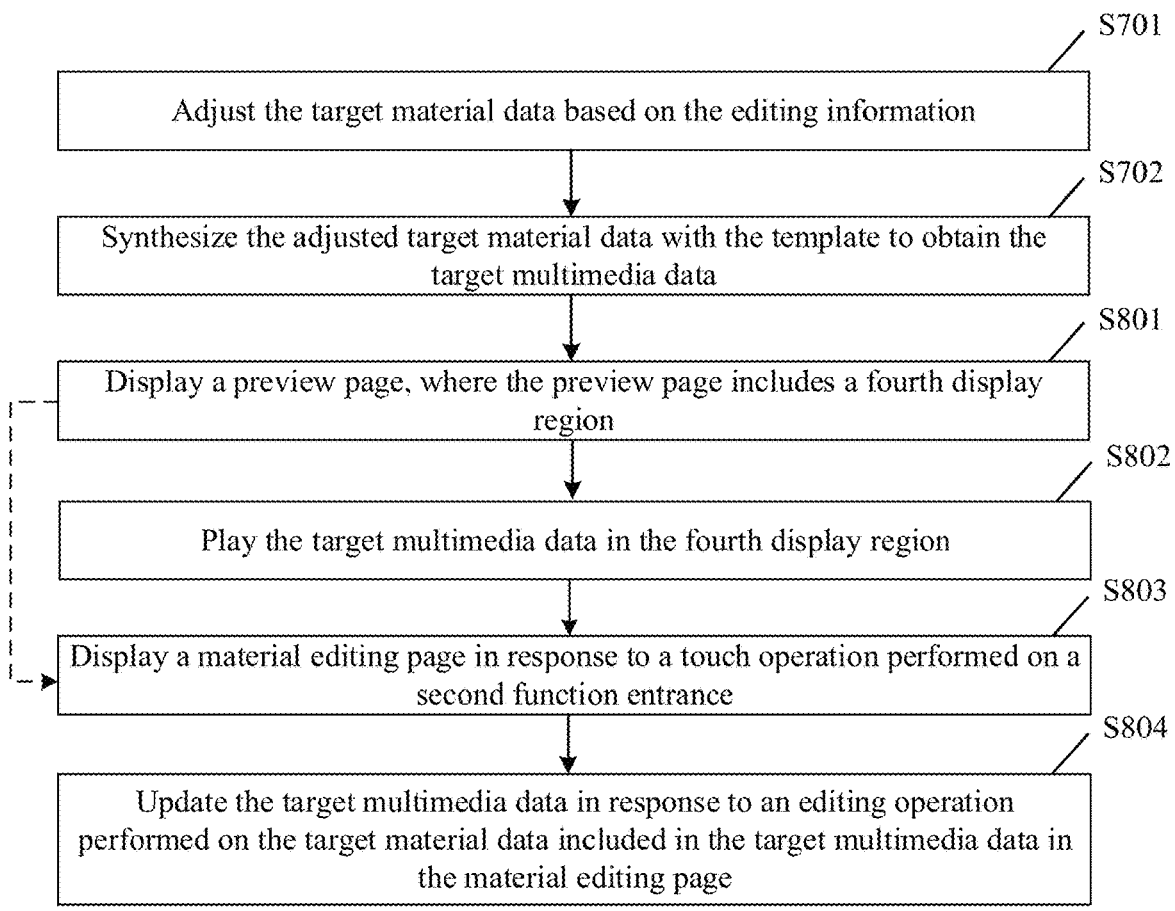
FIG. 8 is a flow chart of a method for generating multimedia data according to an embodiment of the present disclosure.

In an embodiment, as shown in FIG. 8, before the operation of playing the target multimedia data in step S703, the method includes step S801. In step S801, a preview page is displayed. The preview page includes a fourth displaying region. The operation of playing the target multimedia data in step S703 includes step S802. In step S802, the target multimedia data is played in the fourth displaying region.

Figure 13A:
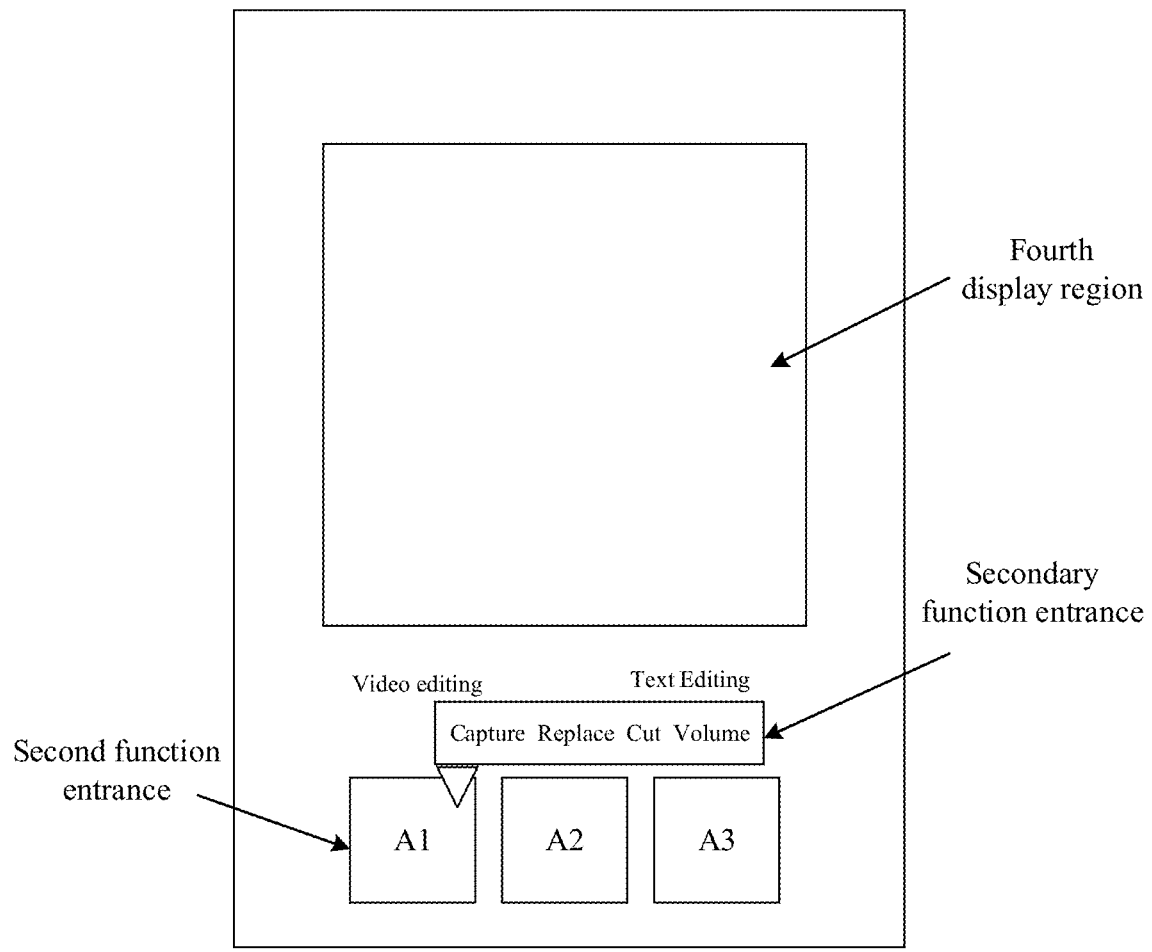
FIG. 13a is a schematic diagram of a preview page in a method for generating multimedia data according to an embodiment of the present disclosure.
Figure 13B:
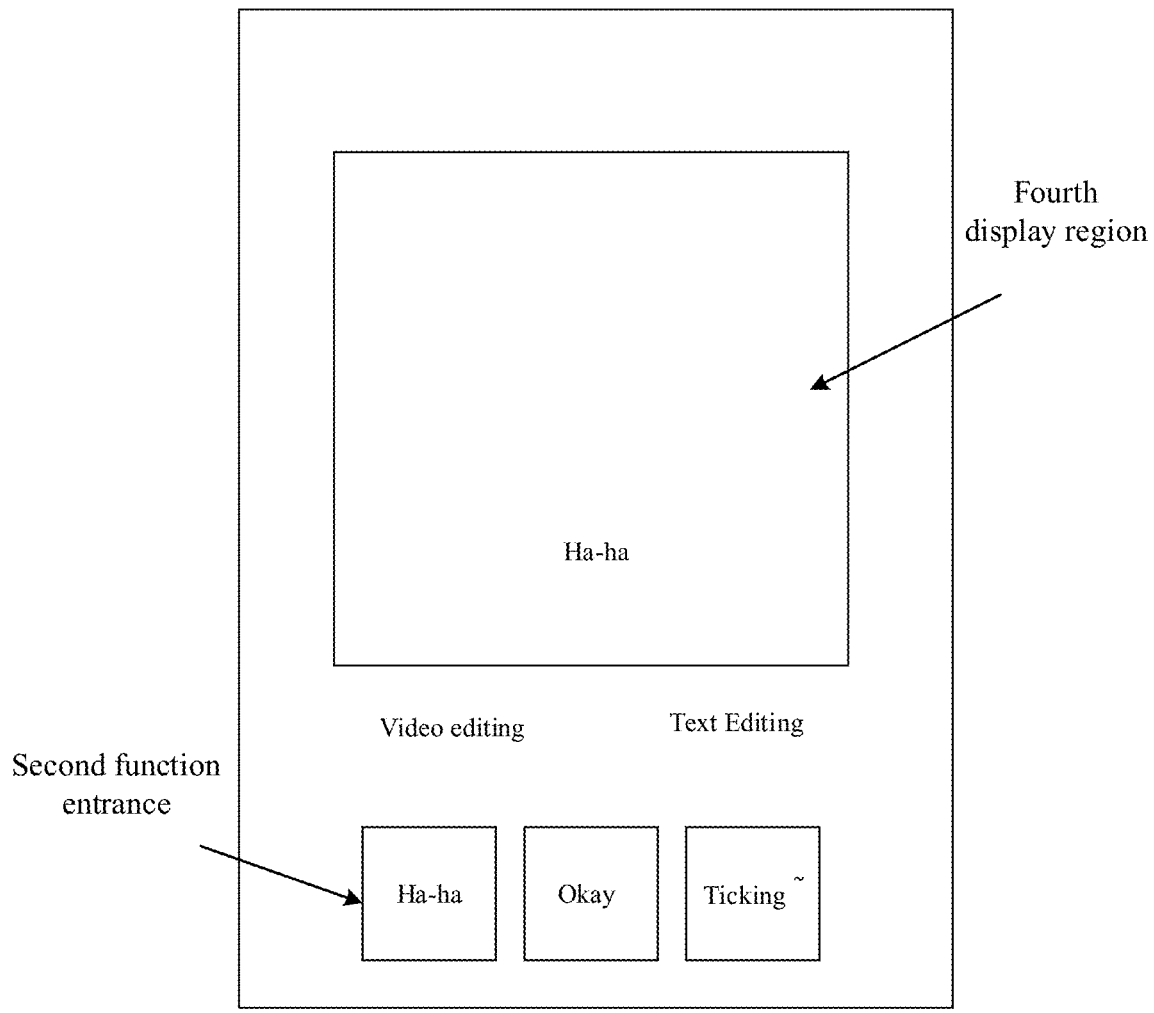
FIG. 13b is a schematic diagram of a preview page in a method for generating multimedia data according to another embodiment of the present disclosure.

Specifically, as shown in FIGS. 13a and 13b, the fourth displaying region is configured to play the target multimedia data, and the user may trigger a pause function control to pause the playback of the target multimedia data at any time in the preview process.

In an embodiment, the preview page as shown in FIGS. 13a and 13b further includes a second function entrance for editing target material data included in the target multimedia data.

In an embodiment, with a playback progress of the target multimedia data, the second function entrance may jump into a region in which a corresponding target material data is located to display a function entrance of the corresponding target material data. For example, in a case that a second piece of video data in the target multimedia data is displayed at 3th second, the second function entrance may jump into a region in which the second piece of video data is located to provide the user with a function entrance to edit the second piece of video data. In another embodiment, in response to a touch operation performed by the user on the second function entrance, a playback progress of the target multimedia data jumps to the corresponding target material data and then the target multimedia data is played in the fourth displaying region. For example, in a case that there are three second function entrances respectively corresponding to three pieces of target material data A1, A2 and A3, when the user performs a touch operation (which may be a long pressing operation, a clicking operation, a double clicking operation, a sliding operation, and the like) on the second function entrance corresponding to a second piece of target material data A2, the target multimedia data being played jumps to a position corresponding to the second piece of target material data A2 for playing.

As shown in FIG. 8, after the operation of displaying the preview page in step S801, the method further includes the following steps S803 and S804.

In step S803, a material editing page is displayed in response to a touch operation performed on the second function entrance.

Specifically, the step S803 includes at least one of the following two cases.

In a first case, if the target multimedia data includes material data corresponding to a video, material data corresponding to an audio, and/or material data corresponding to a picture, a secondary function entrance is displayed in the preview page in response to the touch operation performed on the second function entrance, and on receiving a touch operation performed on the secondary function entrance, a page jumping operation is performed, and a material editing page is displayed.

In a second case, if the target multimedia data includes material data corresponding to editable text information configured in the template, a page jumping operation is performed and a material editing page is displayed in response to the touch operation performed on the second function entrance.

In step S804, the target multimedia data is updated in response to an editing operation performed on the target material data included in the target multimedia data in the material editing page.

In an embodiment, the editing operation performed on the target material data includes but is not limited to: an operation of replacing material data and an operation of deleting replaced material data.

In an embodiment, considering that the editing operation on the target material data is performed in a small range, the original multimedia data may be directly updated in real time based on the edited target material data to improve the efficiency of generating multimedia data.

In an embodiment, as shown in FIG. 8, the order in which the step S802 and the steps S803 and S804 is not limited. The steps S801 to S804 may be performed in an order of S801-S802-S803-S804, or in an order of S801-S803-S804 (as shown by the dotted line in FIG. 8).

Figure 9:
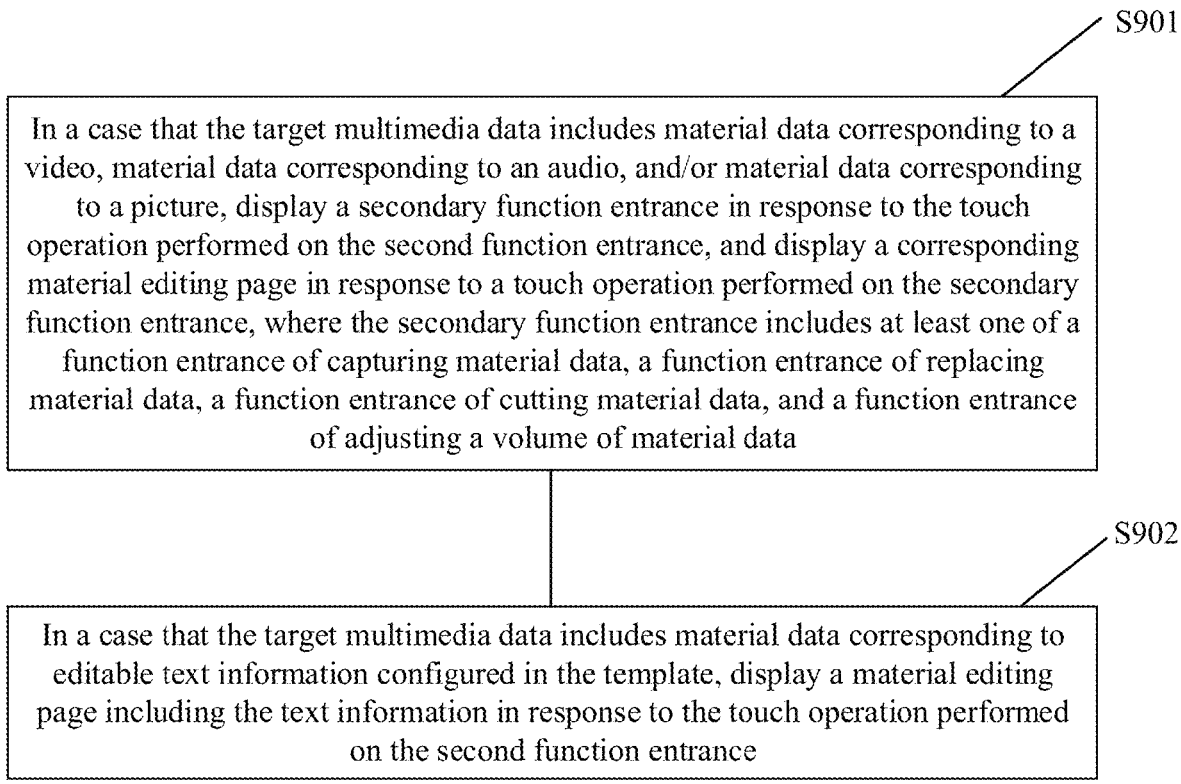
FIG. 9 is a flow chart of a method for generating multimedia data according to an embodiment of the present disclosure.

In an embodiment, as shown in FIG. 9, the operation of displaying a material editing page in response to a touch operation performed on the second function entrance in step S803 includes at least one of the following steps S901 and S902.

In step S901, in a case that the target multimedia data includes material data corresponding to a video, material data corresponding to an audio, and/or material data corresponding to a picture, a secondary function entrance is displayed in response to the touch operation performed on the second function entrance, and a corresponding material editing page is displayed in response to a touch operation performed on the secondary function entrance. The secondary function entrance includes at least one of: a function entrance of capturing material data, a function entrance of replacing material data, a function entrance of cutting material data, and a function entrance of adjusting a volume of material data volume.

In an embodiment, as shown in FIG. 13a, a secondary function entrance is displayed in response to the touch operation performed on the second function entrance. For example, in a case that the target material data includes three pieces of video data, the second function entrance is subsequently displayed in regions where the three pieces of video data are respectively located based on a playback order of the three pieces of video data, and the secondary function entrance is displayed in response to a trigger operation by the user on the second function entrance. The secondary function entrance is displayed above a second function entrance corresponding to a first piece of video data. In addition, in response to a touch operation performed by the user on the second function entrance, the playback progress of the target multimedia data may jump to the corresponding target material data and the target multimedia data is played in the fourth displaying region. Taking FIG. 13a as an example, there are three second function entrances respectively corresponding to three pieces of target material data A1, A2 and A3. After the user initiates a touch operation (which may be a long pressing operation, a clicking operation, a double clicking operation, a sliding operation, and the like) on a second function entrance corresponding to the second piece of target material data A2, the second piece of target material A2 is played in the fourth displaying region.

In step S902, in a case that the target material data included in the target multimedia data is material data corresponding to text information of editable data configured in the template, a material editing page including the text information is displayed in response to the touch operation performed on the second function entrance.

In an embodiment, taking an example with reference to FIG. 13b, before responding to the touch operation on the second function entrance, the preview page displays the fourth displaying region and the second function entrances respectively corresponding to material data corresponding to three pieces of text information, and the fourth displaying region displays material data corresponding to the first piece of text information and other material data played at the same playing time. On responding to the touch operation performed on the second function entrance, a page jumping operation is performed and a material editing page including text information is displayed.

Figure 10:
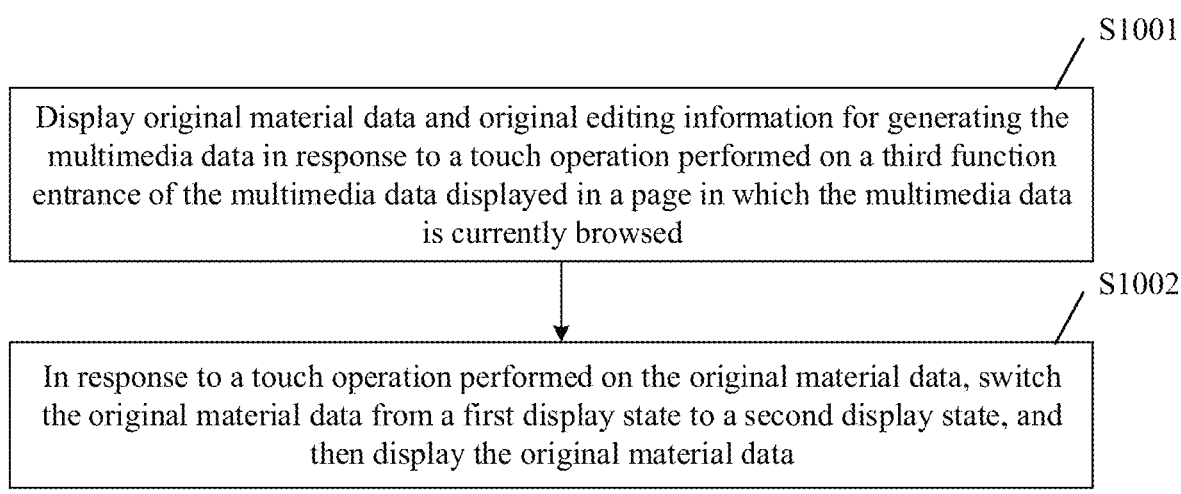
FIG. 10 is a flow chart of a method for generating multimedia data according to an embodiment of the present disclosure.

In an embodiment, as shown in FIG. 10, before the operation of obtaining the template corresponding to the currently browsed multimedia data in step S501, the method further includes the following steps S1001 and S1002.

In step S1001, original material data and original editing information for generating the multimedia data are displayed in response to a touch operation performed on a third function entrance of the multimedia data displayed in a page in which the multimedia data is currently browsed.

Figure 14:
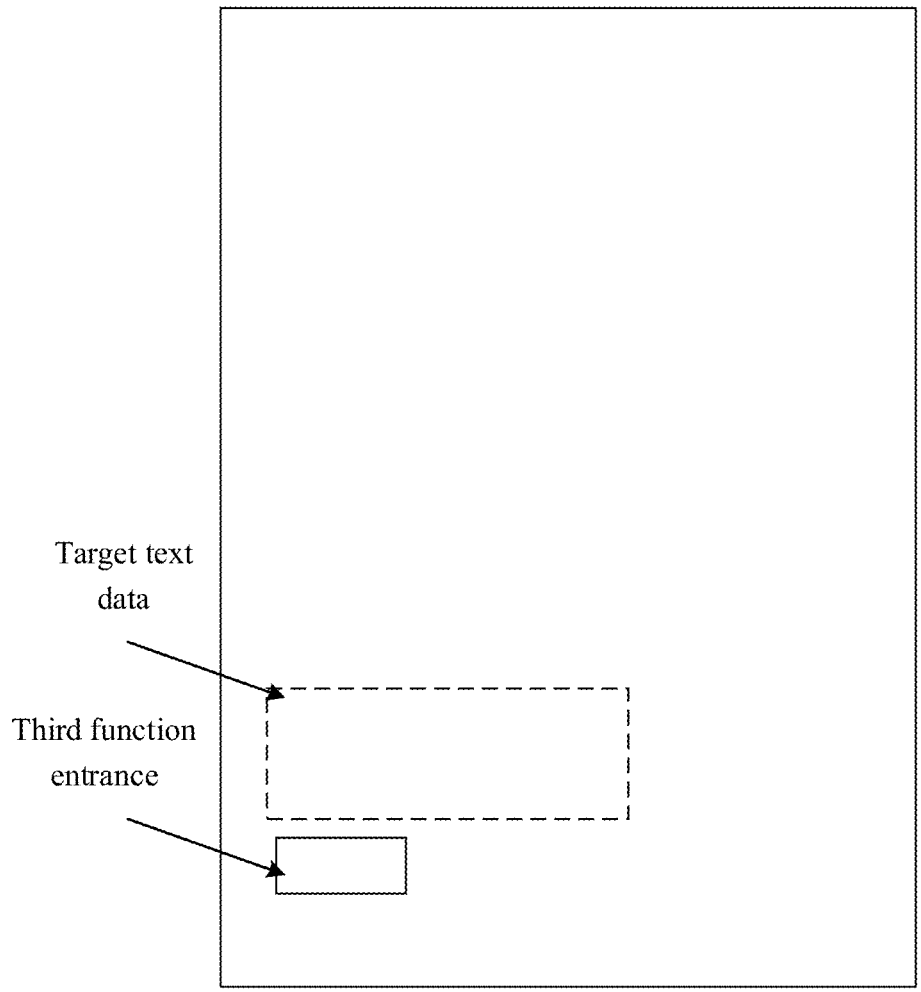
FIG. 14 is a schematic diagram of a page for browsing target multimedia data in a method for generating multimedia data according to an embodiment of the present disclosure.

In an embodiment, as shown in FIG. 14, in displaying the currently browsed multimedia data, a third function entrance is displayed. For example, the third function entrance may be displayed by using a floating layer with high transparency on the page displaying multimedia data. In an embodiment, in displaying the currently browsed multimedia data, target text data may be displayed. The target text data is text information that is displayed on a cover of multimedia data for describing functions of a template and is configured when generating the template. The target text data and/or the third function entrance may be displayed during the user browsing the multimedia data.

Figure 15A:
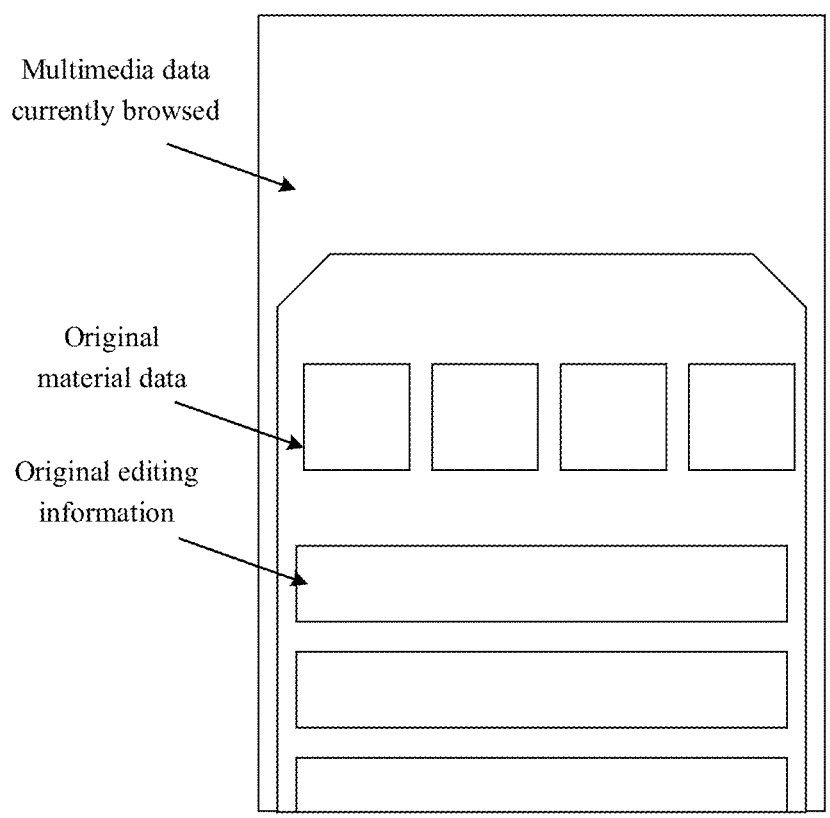
FIG. 15a is a schematic diagram of a page displayed in response to a touch operation performed on a third function entrance in a method for generating multimedia data according to an embodiment of the present disclosure.
Figure 15B:
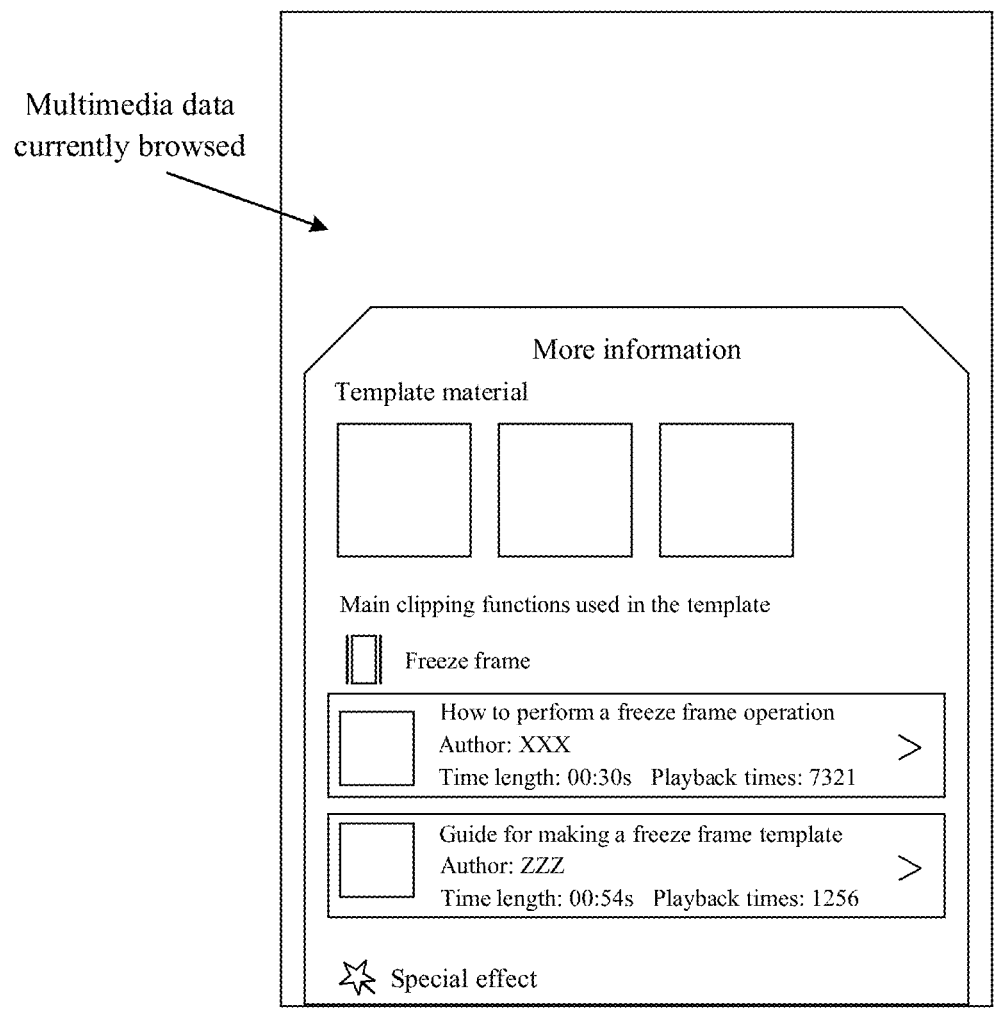
FIG. 15b is a schematic diagram of a page displayed in response to a touch operation performed on a third function entrance in a method for generating multimedia data according to another embodiment of the present disclosure.

In an embodiment, as shown in FIGS. 15a and 15b, in response to a touch operation performed on the third function entrance, the original material data and original editing information for generating the currently browsed multimedia data are displayed.

In step S1002, in response to a touch operation performed on the original material data, the original material data is switched from a first display state to a second display state, and then the original material data is displayed.

In an embodiment, the first display state is a state in which original material data is reduced for display, and the second display state is a state in which original material data is normally displayed or is enlarged for display. In switching the original material in the second display state for display, the original material data in the second display state may be displayed by using a pop up or a floating layer.

In an embodiment, the original material data may be saved in response to a saving instruction for the original material data in the first display state; and/or the original material data may be saved in response to a saving instruction for the original material data in the second display state. In an embodiment, whether the original material data is in the first display state or in the second display state, the user may obtain and store the original material data by triggering a saving instruction.

In an embodiment, the displayed original material data corresponds to labeled material data in generating a template.

In an embodiment, the operation of the displaying original material data and original editing information for generating the multimedia data in step S1001 includes the following steps B1 and B2.

In step B1, the original material data is displayed in an order of playing time.

In an embodiment, in order to facilitate the user viewing the original material data, the original material data is sequentially displayed in an order of playing time of the original material data in the multimedia data. As shown in FIGS. 15a and 15b, a displaying region of the original material data corresponds to the region where the template material is located, and the original material data is sequentially displayed from left to right based on the order of playing time.

In step B2, editing function data and a related video file included in the original editing information are displayed based on a preset function display strategy. The video file may include tutorial data related to the editing function data.

Considering that the multimedia data may involve multiple editing functions, the user may clearly understand editing information adopted in a template by showing the editing functions to the user. In addition, in order to improve the user's experience, reduce the interference due to displaying the original editing information to the user, and improve the exposure rate of various preferred promotional editing functions, the original editing information may be displayed based on a preset function display strategy.

In an embodiment, based on preset priorities and preset display quantity of editing functions in the preset function display strategy, editing function data included in original editing information with the preset display quantity and corresponding tutorial data are displayed in sequence.

In an embodiment, the preset function display strategy includes the priorities configured for the editing functions. For example, assuming that the original editing information involves data of two editing functions of a freeze frame function and a special effect function and the priority of the freeze frame function is higher than the priority of the special effect function, as shown in FIG. 15b, in displaying the freeze frame function, a name of a tutorial corresponding to the freeze frame function, an icon corresponding to the freeze frame function, and related tutorial data may be displayed simultaneously. In displaying the special effect function, a name of a tutorial corresponding to the special effect function, an icon corresponding to the special effect function, and related tutorial data may be displayed simultaneously (in FIG. 15b, the user may browse the tutorial data related to the special effect function by performing a sliding-up operation on the page).

In an embodiment, considering that the original editing information includes data of multiple editing functions, to avoid interference to the user caused by excessive display of data of editing functions and corresponding tutorial data, a preset display number, such as 2, may be configured, and then the data of the editing functions and the corresponding tutorial data are displayed based on the preset display quantity. For example, in displaying the data of editing functions and corresponding tutorial data, only data and corresponding tutorial data of editing functions with first two priorities are displayed.

The data of the editing function may include a name of the editing function and/or a corresponding icon. The data related to the tutorial video may include at least one of a title of the tutorial, an author of the tutorial, a level of the author of the tutorial, a time length of the tutorial, playback times of the tutorial, and the tutorial video.

In an embodiment, the tutorial data may be displayed based on the preset display quantity. Since a same function may involve multiple tutorials, the number of tutorials of which data is displayed may be configured. For example, in a case that the number is 2, in displaying data of one editing function, data of at most two corresponding tutorials may be displayed. In an embodiment, priorities of tutorials of which data is to be displayed may be configured based on playing times of tutorial video in tutorial data, and a tutorial video with high playing times may be displayed preferentially.

In an embodiment, to improve the user's experience, a read filtering operation is arranged in the displayed tutorial data. After a relevant tutorial video is in a read state, a next tutorial video with a highest playback times is displayed.

In an embodiment, when the user clicks any tutorial data, a corresponding tutorial detail page is jumped to and a corresponding tutorial video is displayed.

In an embodiment, the original material data and original editing information for generating the multimedia data are displayed by any one of: performing a pull-up operation on a page (as shown in FIG. 15), performing a pull-down operation on a page, a floating layer, and a pop-up window. In a case that the original material data and original editing information for generating the multimedia data are displayed by performing a pull-up operation on a page or performing a pull-down operation on a page, a size of the page is generally set to two-thirds of a size of a display interface or set according to actual situations. Generally, the size of the page is smaller than the size of the display interface. In a case that the original material data and original editing information for generating the multimedia data are displayed by a floating layer or a pop-up window, a transparency is set according to actual situations, so that the display of the multimedia data is not affected while viewing the original material data and original editing information. That is, the multimedia data currently viewed may be played without pausing while displaying the original material data and the original editing information.

In an embodiment, after generating the target multimedia data based on the target material data and the template, the target multimedia data may be saved and/or published.

In the method and apparatus for generating multimedia data according to the present disclosure, after a template corresponding to currently browsed multimedia data is obtained, a material import page is display. The material import page displays editing information of material data to be imported in the template. The user may import the target material data in the material import page. When a generation instruction is triggered, target multimedia data is generated based on the target material data and the template. According to the embodiments of the present disclosure, the target multimedia data may be generated directly based on the template corresponding to the multimedia data and the imported target material data, reducing the operation steps for the user in generating target multimedia data, improving the efficiency of generating target multimedia data, facilitating the user's operations, reducing the requirements for the terminal to process multimedia data, improving the efficiency and quantity of target multimedia data editing based on templates, and improving the user's operating experience.

Figure 16:
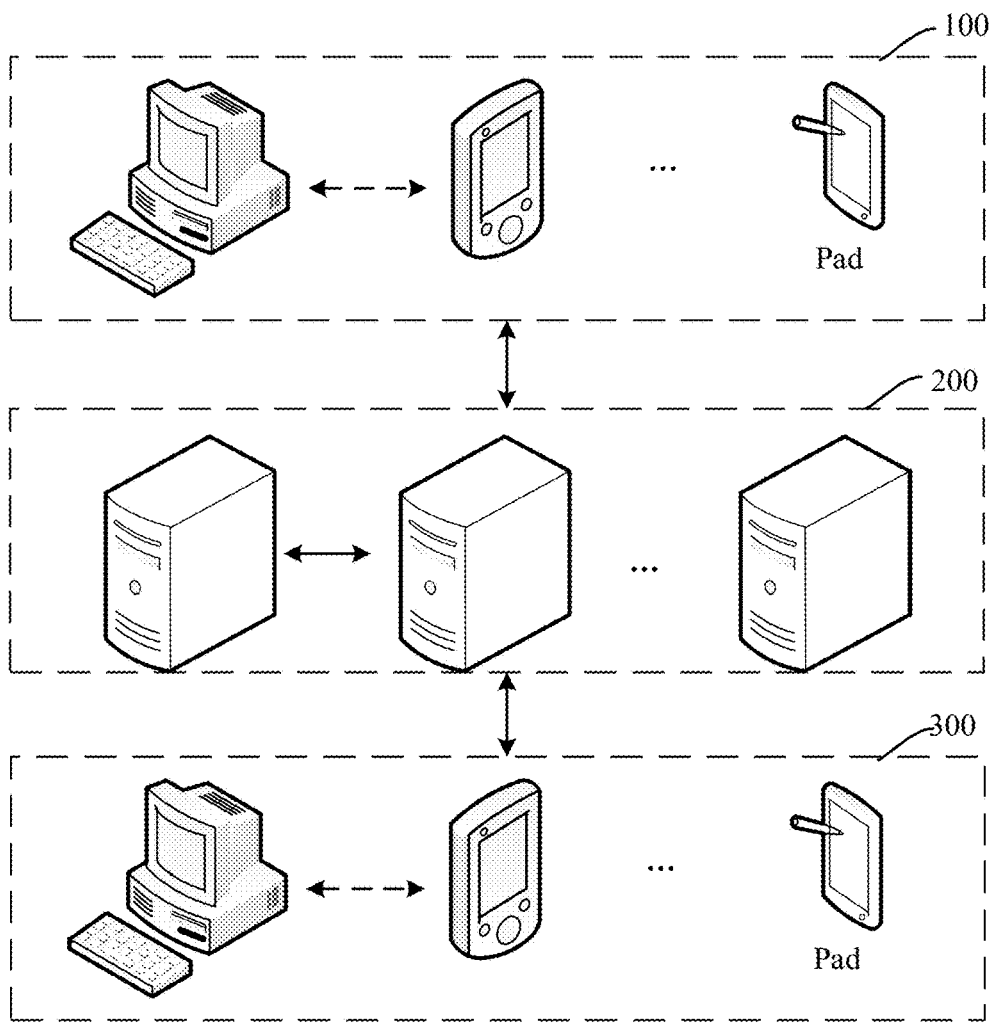
FIG. 16 is a schematic diagram of an application environment of a method for processing multimedia data and a method for generating multimedia data according to an embodiment of the present disclosure.

In an embodiment, as shown in FIG. 16, an execution environment for performing the method for processing and generating a template based on multimedia data is formed based on a first client 100 and a server 200. Based on a second client 300 and a server 200, an execution environment for performing the method for processing and generating target multimedia data based on a template is formed. In the entire application environment, the first client 100 publishes multimedia data and a template, and then uploads the multimedia data and the template to the server 200. After obtaining a corresponding template based on multimedia data pushed by the server 200, the second client 300 obtains new target multimedia data by performing editing based on the multimedia data, and then publishes the new target multimedia data. In an embodiment, the roles of the first client 100 and the second client 300 may be interchanged. That is, the first client 100 publishing the template may obtain a corresponding template based on multimedia data pushed by the server 200 and then edit and publish new target multimedia data based on the template, and the second client 300 may publish multimedia data and a template, and upload the multimedia data and the template to the server 200.

Figure 17:
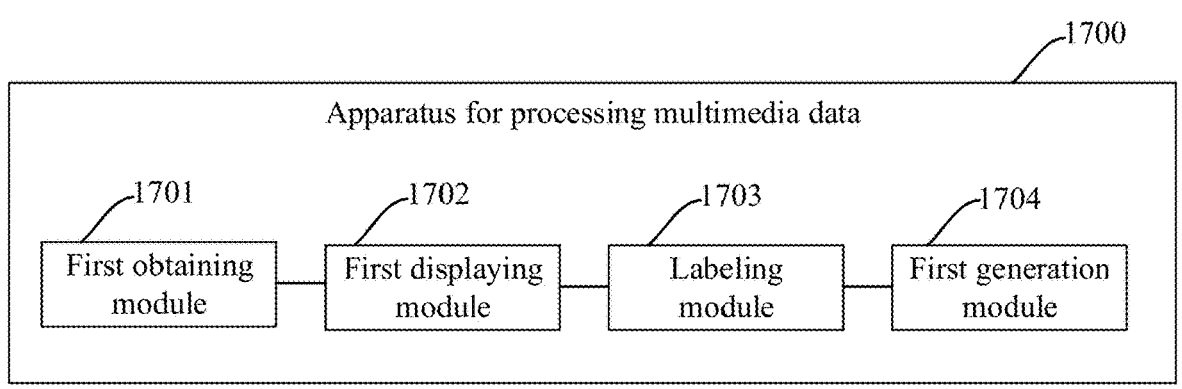
FIG. 17 is a schematic structural diagram of an apparatus for processing multimedia data according to an embodiment of the present disclosure.

Based on the same inventive concept, reference is made to FIG. 17, which is a schematic structural diagram of an apparatus for processing multimedia data according to an embodiment of the present disclosure. An apparatus 1700 for processing multimedia data according to an embodiment of the present disclosure may include: a first obtaining module 1701, a first displaying module 1702, a labeling module 1703, and a first generation module 1704.

The first obtaining module 1701 is configured to obtain multimedia data. The first displaying module 1702 is configured to display an editing page, where the editing page displays material data in the multimedia data. The labeling module 1703 is configure to, in response to a labeling operation performed on least one piece of material data, label the at least one piece of material data. The first generation module 1704 is configured to, in response to a template generation instruction, remove the labeled material data from the multimedia data and generate a template.

In an embodiment, the first displaying module 1702 includes a first displaying unit and/or a second displaying unit. The first displaying unit is configured to display a first editing page in a case that the multimedia data includes material data corresponding to a video, material data corresponding to an audio and/or material data corresponding to a picture. The first editing page includes a first displaying region for displaying the material data and a function control for labeling the material data. The second displaying unit is configured to display a second editing page in a case that the multimedia data includes material data corresponding to text information. The second editing page includes a function control for labeling the material data corresponding to the text information.

In an embodiment, the first generation module 1704 includes a first generation unit and/or a second generation unit. The first generation unit is configured to, in a case that the labeled material data includes material data corresponding to a video, material data corresponding to an audio and/or material data corresponding to a picture, remove the labeled material data from the multimedia data, determine editing information corresponding to the labeled material data in the multimedia data, and generate the template based on multimedia data after removing the labeled material data and the editing information. The second generation unit is configured to, in a case that the labeled material data includes material data corresponding to text information, configure the material data corresponding to the text information as editable data, and generate the template based on multimedia data after configuring the editable data.

In an embodiment, the apparatus 1700 according to the embodiment of the present disclosure further includes a cover page configuration module. The cover page configuration module is configured to, in response to a labeling operation performed on an image frame in the multimedia data, configure the image frame as a cover image in displaying the multimedia data.

In an embodiment, the cover page configuration module is further configured to obtain target text data, superpose the target text data on the cover image, and update the multimedia data based on the cover image superimposed with the target text data.

In an embodiment, the first obtaining module 1701 includes any one of a first obtaining unit and a second obtaining unit. The first obtaining unit is configured to obtain multimedia data generated by performing an editing operation based on a template. The second obtaining unit is configured to obtain multimedia data generated by performing an editing operation based on at least one of currently captured material data and pre-stored material data.

In an embodiment, the first generation module 1703 is further configured to, after generating the template, save and/or publish the multimedia data and the template. The operation of publishing the multimedia data and the template includes uploading the multimedia data and the template to a server.

The apparatus for processing multimedia data according to the embodiments of the present disclosure may perform the method for processing multimedia data according to the embodiments of the present disclosure, and the implementation principle of the apparatus is similar to the implementation principle of the method. The actions performed by the modules in the apparatus for processing multimedia data according to the embodiments of the present disclosure correspond to the steps in the method for processing multimedia data according to the embodiments of the present disclosure. The detail descriptions of functions of the modules in the apparatus for processing multimedia data may refer to the descriptions of the corresponding method for processing multimedia data in the above embodiments, and are not repeated herein.

Figure 18:
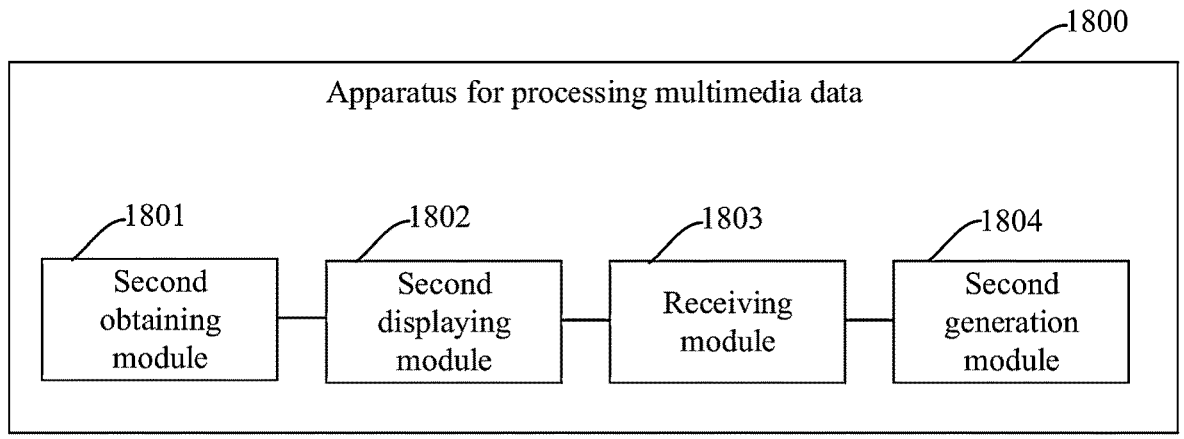
FIG. 18 is a schematic structural diagram of an apparatus for generating multimedia data according to an embodiment of the present disclosure.

Based on the same inventive concept, reference is made to FIG. 18, which is a schematic structural diagram of an apparatus for generating multimedia data according to an embodiment of the present disclosure. An apparatus 1800 for generating multimedia data according to an embodiment of the present disclosure may include: a second obtaining module 1801, a second displaying module 1802, a receiving module 1803, and a second generation module 1804.

The second obtaining module 1801 is configured to obtain a template corresponding to currently browsed multimedia data. The second displaying module 1802 is configured to display a material import page, where the material import page displays editing information of material data to be imported in the template. The receiving module 1803 is configured to receive imported target material data. The second generation module 1804 is configured to, in response to a generation instruction, generate target multimedia data based on the target material data and the template.

In an embodiment, the second displaying module 1802 includes a third displaying unit and/or a fourth displaying unit. The third displaying unit is configured to display a first material import page in a case that the material data to be imported includes material data corresponding to a video, material data corresponding to an audio and/or material data corresponding to a picture. The first material import page includes a second displaying region for displaying pre-stored material data, a third displaying region for displaying the editing information, and a first function entrance for starting an imaging device. The fourth displaying unit is configured to display a second material import page in a case that the material data to be imported includes material data corresponding to text information. The second material import page includes an editing region for editing the text information In an embodiment, the second generation module 1804 includes: an adjustment unit, a synthesizing unit, and a playing unit. The adjustment unit is configured to adjusting the target material data based on the editing information. The synthesizing unit is configured to synthesize the adjusted target material data with the template to obtain the target multimedia data. The playing unit is configured to play the target multimedia data.

In an embodiment, the adjustment unit includes a first adjustment sub unit and/or a second adjustment sub unit.

The editing information includes at least one of: a time length of the material data to be imported, an audio attribute of the material data to be imported, and a resolution of the material data to be imported. The first adjustment sub unit is configured to, in a case that the target material data includes target video data, perform at least one of the following operations: based on the time length of the material data to be imported, intercepting a content corresponding to the time length from the target video data; adjusting a playback speed of the target video data to control a playback time length of the target video data to be compatible with the time length of the material data to be imported; based on the audio attribute, deleting audio data from the target video data; adjusting a playing volume of the audio data in the target video data based on the audio attribute; and adjusting a resolution of the target video data to adapt to the resolution of the material data to be imported.

The editing information includes at least one of: a size of the material data to be imported and a resolution of the material data to be imported. The second adjustment sub unit is configured to, in a case that the target material data includes target picture data, perform at least one of the following operations: adjusting a size of the target picture data based on the size of the material data to be imported; and adjusting a resolution of the target picture data to adapt to the resolution of the material data to be imported.

In an embodiment, the second generation module 1804 further includes a previewing unit. The previewing unit is configured to display a preview page. The preview page includes a fourth displaying region. The playing unit is further configured to play the target multimedia data in the fourth displaying region.

In an embodiment, the preview page further includes a second function entrance for editing target material data included in the target multimedia data. The second generation module 1804 further includes: a first response unit and a second response unit. The first response unit is configured to display a material editing page in response to a touch operation performed on the second function entrance. The second response unit is configured to update the target multimedia data in response to an editing operation performed on the target material data included in the target multimedia data in the material editing page.

In an embodiment, the first response unit is further configured to, in a case that the target multimedia data includes material data corresponding to a video, material data corresponding to an audio, and/or material data corresponding to a picture, display a secondary function entrance in response to the touch operation performed on the second function entrance, and display a corresponding material editing page in response to a touch operation performed on the secondary function entrance. The secondary function entrance includes at least one of a function entrance of capturing material data, a function entrance of replacing material data, a function entrance of cutting material data, and a function entrance of adjusting a volume of material data.

In an embodiment, the first response unit is further configured to, in a case that the target multimedia data includes material data corresponding to editable text information configured in the template, display a material editing page including the text information in response to the touch operation performed on the second function entrance.

In an embodiment, the apparatus 1800 according to the embodiments of the present disclosure further includes a third displaying module. The third displaying module is configured to display original material data and original editing information for generating the multimedia data in response to a touch operation performed on a third function entrance of the multimedia data displayed in a page in which the multimedia data is currently browsed.

In an embodiment, the third displaying module includes a switching unit. The switching unit is configured to, in response to a touch operation performed on the original material data, switch the original material data from a first display state to a second display state, and then display the original material data.

In an embodiment, the third displaying module includes a material displaying unit and a sorting displaying unit. The material displaying unit is configured to display the original material data in an order of playing time. The sorting displaying unit is configured to display the original editing information of a preset display quantity based on priorities of corresponding preset editing functions.

The apparatus for generating multimedia data according to the embodiments of the present disclosure may perform the method for generating multimedia data according to the embodiments of the present disclosure, and the implementation principle of the apparatus is similar to the implementation principle of the method. The actions performed by the modules in the apparatus for generating multimedia data according to the embodiments of the present disclosure correspond to the steps in the method for generating multimedia data according to the embodiments of the present disclosure. The detail descriptions of functions of the modules in the apparatus for generating multimedia data may refer to the descriptions of the corresponding method for generating multimedia data in the above embodiments, and are not repeated herein.

Hereinafter, reference is made to FIG. 19, which shows a schematic structural diagram of an electronic device 1900 suitable for implementing the embodiments of the present disclosure. The electronic devices according to the embodiments of the present disclosure may include, but are not limited to, devices such as computers. The electronic device shown in FIG. 19 is only exemplary, and should not indicate any limitation to the function and application scope of the embodiments of the present disclosure.

The electronic device includes: a memory and a processor. The memory stores a program for performing the method according to the above method embodiments. The processor is configured to perform the program stored in the memory. The processor may be referred to as a processing device 1901 described below. The memory may include at least one of a read only memory (ROM) 1902, a random access memory (RAM) 1903, and a memory device 1908. Detail descriptions are provided as follows.

Figure 19:
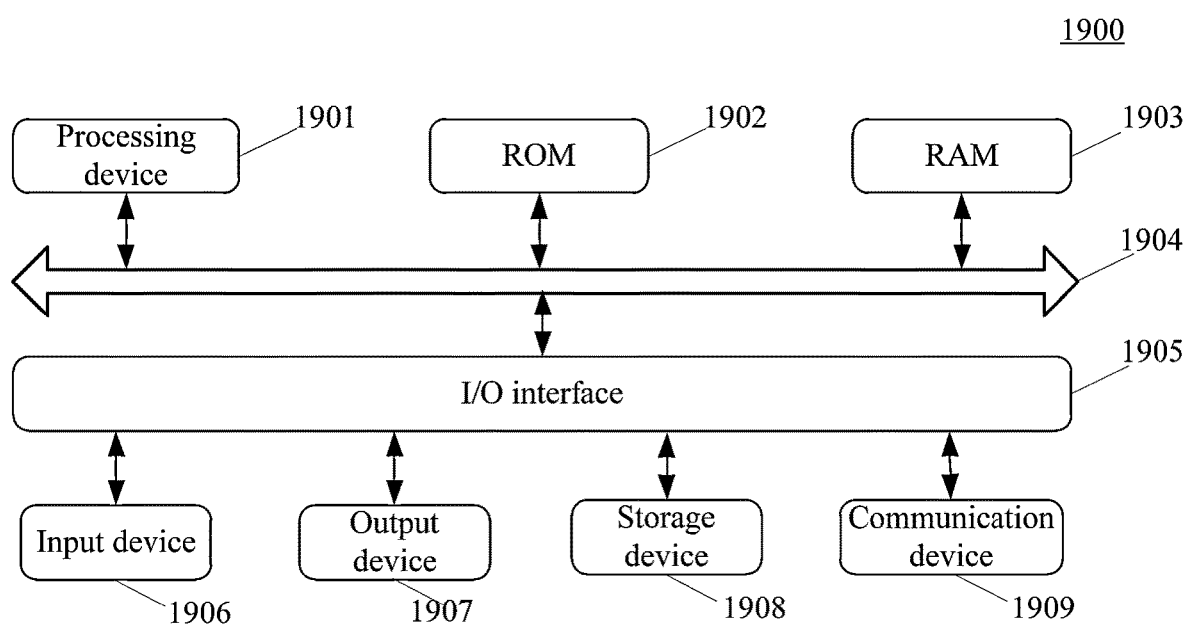
FIG. 19 is a schematic structural diagram of an electronic device according to an embodiment of the present disclosure.

As shown in FIG. 19, the electronic device 1900 may include a processing device 1901 (such as a central processor and a graphics processor) which may execute various operations and processing through a program stored in a Read Only Memory (ROM) 1902 or a program loaded from the storage device 1908 into a Random Access Memory (RAM) 1903. The RAM 1903 is further configured to store various programs and data required by the electronic device 1900. The processing device 1901, the ROM 1902 and the RAM 1903 are connected to each other through a bus 1904. An Input/output (I/O) interface 1905 is also connected to the bus 1904.

Generally, the I/O interface 1905 may be connected to: an input device 1906, such as a touch screen, a touch panel, a keyboard, a mouse, a camera, a microphone, an accelerometer, and a gyroscope; an output device 1907, such as a liquid crystal display (LCD), a speaker, and a vibrator; a storage device 1908 such as a magnetic tape and a hard disk; and a communication device 1909. The communication device 1909 enables the electronic device 1900 to perform wireless or wired communication with other devices for data exchanging. Although FIG. 19 shows an electronic device 1900 having various components, it should be understood that the illustrated components are not necessarily required to all be implemented or included. Alternatively, more or fewer components may be implemented or included.

Particularly, according to an embodiment of the present disclosure, the process described above in conjunction with flow charts may be implemented as a computer program. For example, a computer program product is further provided in an embodiment in the present disclosure, including a computer program carried on a non-transitory computer readable storage medium. The computer program includes program codes for performing the method shown in the flow charts. In the embodiment, the computer program may be downloaded and installed from the network via the communication device 1909, or installed from the storage device 1908, or installed from the ROM 1902. When the computer program is executed by the processing device 1901, the above-mentioned functions defined in the method according to the embodiments of the present disclosure are performed.

It should be noted that, the computer readable medium mentioned herein may be a computer readable signal medium or a computer readable storage medium or any combination thereof. The computer readable storage medium may be, but is not limited to, a system, an apparatus, or a device in an electronic, magnetic, optical, electromagnetic, infrared, or semi-conductive form, or any combination thereof. The computer readable storage medium may be, but is not limited to, an electrical connection with one or more wires, a portable computer disk, a hard disk, a random access memory (RAM), a read-only memory (ROM), an erasable programmable read-only memory (EPROM or flash memory), an optical fiber, a portable compact disc read-only memory (CD-ROM), a light storage device, a magnetic storage device or any combination thereof. In the present disclosure, the computer readable storage medium may be any tangible medium containing or storing a program, and the program may be used by or in combination with an instruction execution system, apparatus, or device. In the present disclosure, the computer readable signal medium may be a data signal transmitted in a baseband or transmitted as a part of a carrier wave and carrying computer readable program codes. The transmitted data signal may be in various forms, including but not limited to an electromagnetic signal, an optical signal or any proper combination thereof. The computer readable signal medium may be any computer readable medium other than the computer readable storage medium and can send, propagate or transmit programs to be used by or with an instruction execution system, apparatus or device. The program codes stored in the computer readable storage medium may be transmitted via any proper medium including but not limited to: wired, optical fiber cable, radio frequency (RF), or any suitable combination of the foregoing.

In some embodiments, the client and the server may perform communication using any currently known or future developed network protocol such as HTTP (HyperText Transfer Protocol), and may be interconnected with any form or medium of digital data communication (for example, a communication network). The communication network embodiments include local area networks ("LANs"), wide area networks ("WANs"), internet, end-to-end networks (for example, ad hoc end-to-end networks), and any networks currently known or developed in the future.

The computer readable storage medium may be incorporated in the electronic device, or may exist independently without being assembled into the electronic device.

The computer readable storage medium carries one or more programs. The one or more programs, when being executed by the electronic device, cause the electronic device to perform the method for processing multimedia data or the method for generating multimedia data.

Computer program code for performing operations of the present disclosure may be written in one or more programming languages, or a combination of the foregoing, and the programming language includes, but is not limited to, object oriented programming languages, such as Java, Smalltalk, and C++, also includes conventional procedural programming languages, such as "C" language or similar programming languages. The program codes may be executed entirely on a user's computer, or be executed partly on the user's computer, or be executed as a stand-alone software package, or be executed partly on the user's computer and partly on a remote computer, or be executed entirely on the remote computer or server. In a case that the execution of the program code involves a remote computer, the remote computer may be connected to a user's computer via any kind of network, including a local area network (LAN) or a wide area network (WAN), or may be connected to an external computer (for example, via an Internet providing by an Internet service provider).

The flow charts and schematic diagrams in the Figures shows the architecture, functionality and operation of possible implementations of the products of system, method and computer program provided according to the embodiments of the present disclosure. Each block in the flow charts or schematic diagrams can represent a module, a program segment, or a part of code, and the module, the program segment, or the part of code includes one or more executable instructions for implementing specified logical functions. It should be noted that in some alternative implementations, the functions noted in the blocks may be implemented in a different order than those illustrated in the Figures. For example, two blocks shown in succession may in fact be executed substantially in parallel, and they may sometimes be executed in a reverse order, depending upon the functionality involved. It also should be noted that each block in the schematic diagrams and/or flow charts, and combinations of blocks in the schematic diagrams and/or flowcharts, can be implemented by a dedicated hardware-based system which is configured to implement specified functions or operations, or can be implemented by using a combination of dedicated hardware and computer instructions.

The modules or units mentioned in the description of the embodiments of the present disclosure may be implemented by means of software, or otherwise by means of hardware. In some circumstances, the name of a module or a unit does not constitute a limitation on the module or the unit itself. For example, the receiving module may also be described as "a module for receiving imported target material data".

The functions described above in this application may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and so on.

In the present disclosure, the machine-readable medium may be a tangible medium, which may contain or store a program used by the instruction execution system, apparatus, or device or a program used in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of thereof. The machine-readable storage media, for example, includes an electrical connection based on one or more wires, a portable computer disk, a hard drive, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of thereof.

According to one or more embodiments of the present disclosure, a method for processing multimedia data is provided. The method includes: obtaining multimedia data; displaying an editing page, where the editing page displays material data in the multimedia data; in response to a labeling operation performed on least one piece of material data, labeling the at least one piece of material data; and in response to a template generation instruction, removing the labeled material data from the multimedia data and generating a template.

In an embodiment, the displaying an editing page includes at least one of: displaying a first editing page in a case that the multimedia data includes material data corresponding to a video, material data corresponding to an audio and/or material data corresponding to a picture, where the first editing page includes a first displaying region for displaying the material data and a function control for labeling the material data; and displaying a second editing page in a case that the multimedia data includes material data corresponding to text information, where the second editing page includes a function control for labeling the material data corresponding to the text information.

In an embodiment, the removing the labeled material data from the multimedia data and generating a template includes: in a case that the labeled material data includes material data corresponding to a video, material data corresponding to an audio and/or material data corresponding to a picture, removing the labeled material data from the multimedia data, and determining editing information corresponding to the labeled material data in the multimedia data; and generating the template based on multimedia data after removing the labeled material data and the editing information.

In an embodiment, the removing the labeled material data from the multimedia data and generating a template includes: in a case that the labeled material data includes material data corresponding to text information, configuring the material data corresponding to the text information as editable data; and generating the template based on multimedia data after configuring the editable data.

In an embodiment, the method for processing multimedia data further includes: in response to a labeling operation performed on an image frame in the multimedia data, configuring the image frame as a cover image in displaying the multimedia data.

In an embodiment, after configuring the image frame as the cover image in displaying the multimedia data, the method further includes: obtaining target text data, and superposing the target text data on the cover image; and updating the multimedia data based on the cover image superimposed with the target text data.

In an embodiment, the obtaining multimedia data includes one of: obtaining multimedia data generated by performing an editing operation based on a template; and obtaining multimedia data generated by performing an editing operation based on at least one of currently captured material data and pre-stored material data.

In an embodiment, after removing the labeled material data from the multimedia data and generating the template, the method further includes: saving and/or publishing the multimedia data and the template. The publishing the multimedia data and the template includes: uploading the multimedia data and the template to a server.

According to one or more embodiments of the present disclosure, a method for generating multimedia data is provided. The method includes: obtaining a template corresponding to currently browsed multimedia data; displaying a material import page, where the material import page displays editing information of material data to be imported in the template; receiving imported target material data; and in response to a generation instruction, generating target multimedia data based on the target material data and the template.

In an embodiment, the displaying a material import page includes at least one of: displaying a first material import page in a case that the material data to be imported includes material data corresponding to a video, material data corresponding to an audio and/or material data corresponding to a picture, where the first material import page includes a second displaying region for displaying pre-stored material data, a third displaying region for displaying the editing information, and a first function entrance for starting an imaging device; and displaying a second material import page in a case that the material data to be imported includes material data corresponding to text information, where the second material import page includes an editing region for editing the text information.

In an embodiment, the in response to a generation instruction, generating target multimedia data based on the target material data and the template includes: adjusting the target material data based on the editing information; synthesizing the adjusted target material data with the template to obtain the target multimedia data; and playing the target multimedia data.

In an embodiment, the editing information includes at least one of: a time length of the material data to be imported, an audio attribute of the material data to be imported, and a resolution of the material data to be imported. In a case that the target material data includes target video data, the adjusting the target material data based on the editing information includes at least one of: based on the time length of the material data to be imported, intercepting a content corresponding to the time length from the target video data; adjusting a playback speed of the target video data to control a playback time length of the target video data to be compatible with the time length of the material data to be imported; based on the audio attribute, deleting audio data from the target video data; adjusting a playing volume of the audio data in the target video data based on the audio attribute; and adjusting a resolution of the target video data to adapt to the resolution of the material data to be imported.

In an embodiment, the editing information includes one or more of: a size of the material data to be imported and a resolution of the material data to be imported. In a case that the target material data includes target picture data, the adjusting the target material data based on the editing information includes at least one of: adjusting a size of the target picture data based on the size of the material data to be imported; and adjusting a resolution of the target picture data to adapt to the resolution of the material data to be imported.

In an embodiment, the playing the target multimedia data includes: displaying a preview page and playing the target multimedia data, where the preview page includes a fourth displaying region for displaying the target multimedia data and a second function entrance for editing target material data included in the target multimedia data; displaying a material editing page in response to a touch operation performed on the second function entrance; editing the target material data included in the target multimedia data in the material editing page; and updating the target multimedia data based on the edited target material data.

In an embodiment, the displaying a material editing page in response to a touch operation performed on the second function entrance includes at least one of: in a case that the target multimedia data includes material data corresponding to a video, material data corresponding to an audio, and/or material data corresponding to a picture, displaying a secondary function entrance in response to the touch operation performed on the second function entrance, and displaying a corresponding material editing page in response to a touch operation performed on the secondary function entrance. The secondary function entrance includes at least one of: a function entrance of capturing material data, a function entrance of replacing material data, a function entrance of cutting material data, and a function entrance of adjusting a volume of material data.

In a case that the target multimedia data includes material data corresponding to editable text information configured in the template, a material editing page including the text information is displayed in response to the touch operation performed on the second function entrance.

In an embodiment, before obtaining the template corresponding to the currently browsed multimedia data, the method further includes: displaying original material data and original editing information for generating the multimedia data in response to a touch operation performed on a third function entrance of the multimedia data displayed in a page in which the multimedia data is currently browsed; and in response to a touch operation performed on the original material data, switching the original material data from a first display state to a second display state, and then displaying the original material data.

In an embodiment, the displaying original material data and original editing information for generating the multimedia data includes: displaying the original material data in an order of playing time; and displaying the original editing information of a preset display quantity based on priorities of corresponding preset editing functions.

According to one or more embodiments of the present disclosure, an apparatus for processing multimedia data is provided. The apparatus includes: a first obtaining module, a first displaying module, a labeling module, and a first generation module. The first obtaining module is configured to obtain multimedia data. The first displaying module is configured to display an editing page, where the editing page displays material data in the multimedia data. The labeling module is configure to, in response to a labeling operation performed on least one piece of material data, label the at least one piece of material data. The first generation module is configured to, in response to a template generation instruction, remove the labeled material data from the multimedia data and generate a template.

In an embodiment, the first displaying module includes a first displaying unit and/or a second displaying unit. The first displaying unit is configured to display a first editing page in a case that the multimedia data includes material data corresponding to a video, material data corresponding to an audio and/or material data corresponding to a picture. The first editing page includes a first displaying region for displaying the material data and a function control for labeling the material data. The second displaying unit is configured to display a second editing page in a case that the multimedia data includes material data corresponding to text information. The second editing page includes a function control for labeling the material data corresponding to the text information.

In an embodiment, the first generation module includes a first generation unit and/or a second generation unit. The first generation unit is configured to, in a case that the labeled material data includes material data corresponding to a video, material data corresponding to an audio and/or material data corresponding to a picture, remove the labeled material data from the multimedia data, determine editing information corresponding to the labeled material data in the multimedia data, and generate the template based on multimedia data after removing the labeled material data and the editing information. The second generation unit is configured to, in a case that the labeled material data includes material data corresponding to text information, configure the material data corresponding to the text information as editable data, and generate the template based on multimedia data after configuring the editable data.

In an embodiment, the apparatus according to the embodiments of the present disclosure further includes a cover page configuration module. The cover page configuration module is configured to, in response to a labeling operation performed on an image frame in the multimedia data, configure the image frame as a cover image in displaying the multimedia data.

In an embodiment, the cover page configuration module is further configured to obtain target text data, superpose the target text data on the cover image, and update the multimedia data based on the cover image superimposed with the target text data.

In an embodiment, the first obtaining module includes any one of a first obtaining unit and a second obtaining unit. The first obtaining unit is configured to obtain multimedia data generated by performing an editing operation based on a template. The second obtaining unit is configured to obtain multimedia data generated by performing an editing operation based on at least one of currently captured material data and pre-stored material data.

In an embodiment, the first generation module is further configured to, after generating the template, save and/or publish the multimedia data and the template. The operation of publishing the multimedia data and the template includes uploading the multimedia data and the template to a server.

According to one or more embodiments of the present disclosure, an apparatus for generating multimedia data is provided. The apparatus includes: a second obtaining module, a second displaying module, a receiving module, and a second generation module. The second obtaining module is configured to obtain a template corresponding to currently browsed multimedia data. The second displaying module is configured to display a material import page, where the material import page displays editing information of material data to be imported in the template. The receiving module is configured to receive imported target material data. The second generation module is configured to, in response to a generation instruction, generate target multimedia data based on the target material data and the template.

In an embodiment, the second displaying module includes a third displaying unit and/or a fourth displaying unit. The third displaying unit is configured to display a first material import page in a case that the material data to be imported includes material data corresponding to a video, material data corresponding to an audio and/or material data corresponding to a picture. The first material import page includes a second displaying region for displaying pre-stored material data, a third displaying region for displaying the editing information, and a first function entrance for starting an imaging device. The fourth displaying unit is configured to display a second material import page in a case that the material data to be imported includes material data corresponding to text information. The second material import page includes an editing region for editing the text information.

In an embodiment, the second generation module includes: an adjustment unit, a synthesizing unit, and a playing unit. The adjustment unit is configured to adjusting the target material data based on the editing information. The synthesizing unit is configured to synthesize the adjusted target material data with the template to obtain the target multimedia data. The playing unit is configured to play the target multimedia data.

In an embodiment, the adjustment unit includes a first adjustment sub unit and/or a second adjustment sub unit.

The editing information includes at least one of: a time length of the material data to be imported, an audio attribute of the material data to be imported, and a resolution of the material data to be imported. The first adjustment sub unit is configured to, in a case that the target material data includes target video data, perform at least one of the following operations: based on the time length of the material data to be imported, intercepting a content corresponding to the time length from the target video data; adjusting a playback speed of the target video data to control a playback time length of the target video data to be compatible with the time length of the material data to be imported; based on the audio attribute, deleting audio data from the target video data; adjusting a playing volume of the audio data in the target video data based on the audio attribute; and adjusting a resolution of the target video data to adapt to the resolution of the material data to be imported.

The editing information includes at least one of: a size of the material data to be imported and a resolution of the material data to be imported. The second adjustment sub unit is configured to, in a case that the target material data includes target picture data, perform at least one of the following operations: adjusting a size of the target picture data based on the size of the material data to be imported;

and adjusting a resolution of the target picture data to adapt to the resolution of the material data to be imported.

In an embodiment, the second generation module further includes a previewing unit. The previewing unit is configured to display a preview page. The preview page includes a fourth displaying region. The playing unit is further configured to play the target multimedia data in the fourth displaying region.

In an embodiment, the preview page further includes a second function entrance for editing target material data included in the target multimedia data. The second generation module 1804 further includes: a first response unit and a second response unit. The first response unit is configured to display a material editing page in response to a touch operation performed on the second function entrance. The second response unit is configured to update the target multimedia data in response to an editing operation performed on the target material data included in the target multimedia data in the material editing page.

In an embodiment, the first response unit is further configured to, in a case that the target multimedia data includes material data corresponding to a video, material data corresponding to an audio, and/or material data corresponding to a picture, display a secondary function entrance in response to the touch operation performed on the second function entrance, and display a corresponding material editing page in response to a touch operation performed on the secondary function entrance. The secondary function entrance includes at least one of a function entrance of capturing material data, a function entrance of replacing material data, a function entrance of cutting material data, and a function entrance of adjusting a volume of material data.

In an embodiment, the first response unit is further configured to, in a case that the target multimedia data includes material data corresponding to editable text information configured in the template, display a material editing page including the text information in response to the touch operation performed on the second function entrance.

In an embodiment, the apparatus according to the embodiments of the present disclosure further includes a third displaying module. The third displaying module is configured to display original material data and original editing information for generating the multimedia data in response to a touch operation performed on a third function entrance of the multimedia data displayed in a page in which the multimedia data is currently browsed.

In an embodiment, the third displaying module includes a switching unit. The switching unit is configured to, in response to a touch operation performed on the original material data, switch the original material data from a first display state to a second display state, and then display the original material data.

In an embodiment, the third displaying module includes a material displaying unit and a sorting displaying unit. The material displaying unit is configured to display the original material data in an order of playing time. The sorting displaying unit is configured to display the original editing information of a preset display quantity based on priorities of corresponding preset editing functions.

The above description includes merely preferred embodiments of the present disclosure and explanations of technical principles used. Those skilled in the art should understand that the scope of the present disclosure is not limited to technical solutions formed by a specific combination of the above technical features, but covers other technical solutions formed by any combination of the above technical features or equivalent features thereof without departing from the concept of the present disclosure. For example, a technical solution formed by interchanging the above features with technical features having similar functions as disclosed (but not limited thereto) is also covered in the scope of the present disclosure.

In addition, although the operations are described in a specific order, it should not be understood that these operations are to be performed in the specific order shown or performed in a sequential order. Under certain circumstances, multitasking and parallel processing may be advantageous. Although the specific implementation details are described above, these implementation details should not be construed as limiting the scope of the present disclosure. The features described in multiple separate embodiments may be implemented in combination in a separate embodiment. Conversely, the features described in a separate embodiment may be implemented in multiple embodiments individually or in any suitable sub-combination. Although the subject matter has been described in language specific to structural features and/or logical actions of the method, it should be understood that the subject matter defined in the appended claims are unnecessarily limited to the specific features or actions described above. The specific features and actions described above are merely exemplary forms of implementing the claims.

The invention claimed is:

1. A method for processing multimedia data, comprising:
obtaining multimedia data, the multimedia data including multiple pieces of material data and editing information associated with the multiple pieces of material data, the multiple pieces of material data including at least one of video data, picture data, text data and audio data, the editing information including a time length and a sorting position of each piece of material data, the time length being a playing time length of the material data in the multimedia data, the sorting position indicates a playing order of the material data in the multimedia data;
displaying an editing page, wherein the editing page displays the material data in the multimedia data, and the each piece of material data is displayed in sequence based on playing instants of the material data in the multimedia data;
in response to a labeling operation performed on at least one piece of material data, labeling the at least one piece of material data; and
in response to a template generation instruction, removing the labeled material data from the multimedia data and generating a template.

2. The method according to claim 1, wherein the displaying an editing page comprises one or more of:
displaying a first editing page in a case that the multimedia data comprises material data corresponding to a video, material data corresponding to an audio and/or material data corresponding to a picture, wherein the first editing page comprises a first displaying region for displaying the material data and a function control for labeling the material data; and
displaying a second editing page in a case that the multimedia data comprises material data corresponding to text information, wherein the second editing page comprises a function control for labeling the material data corresponding to the text information.

3. The method according to claim 1, wherein the removing the labeled material data from the multimedia data and generating a template comprises:

in a case that the labeled material data comprises material data corresponding to a video, material data corresponding to an audio and/or material data corresponding to a picture, removing the labeled material data from the multimedia data, and determining editing information corresponding to the labeled material data in the multimedia data; and generating the template based on multimedia data after removing the labeled material data and the editing information.

4. The method according to claim 1, wherein the removing the labeled material data from the multimedia data and generating a template comprises:

in a case that the labeled material data comprises material data corresponding to text information, configuring the material data corresponding to the text information as editable data; and generating the template based on multimedia data after configuring the editable data.

5. The method according to claim 1, further comprising:

in response to a labeling operation performed on an image frame in the multimedia data, configuring the image frame as a cover image in displaying the multimedia data.

6. The method according to claim 5, wherein after configuring the image frame as the cover image in displaying the multimedia data, the method further comprises:

obtaining target text data, and superposing the target text data on the cover image; and updating the multimedia data based on the cover image superimposed with the target text data.

7. The method according to claim 1, wherein the obtaining multimedia data comprises one of:

obtaining multimedia data generated by performing an editing operation based on a template; and obtaining multimedia data generated by performing an editing operation based on at least one of currently captured material data and pre-stored material data.

8. A method for generating multimedia data, comprising:

obtaining a video template corresponding to currently browsed multimedia data, the multimedia data including multiple pieces of material data and editing information associated with the multiple pieces of material data, the multiple pieces of material data including at least one of video data, picture data, text data and audio data, the editing information including a time length and a sorting position of each piece of material data, the time length being a playing time length of the material data in the multimedia data, the sorting position indicating a playing order of the material data in the multimedia data;

displaying a material import page, wherein the material import page displays the editing information of the material data to be imported in the template;

receiving imported target material data; and in response to a generation instruction, generating target multimedia data based on the target material data and playing instants of the material data in the multimedia data in the template.

9. The method according to claim 8, wherein the displaying a material import page comprises one or more of:

displaying a first material import page in a case that the material data to be imported comprises material data corresponding to a video, material data corresponding to an audio and/or material data corresponding to a picture, wherein the first material import page comprises a second displaying region for displaying pre-stored material data, a third displaying region for displaying the editing information, and a first function entrance for starting an imaging device; and displaying a second material import page in a case that the material data to be imported comprises material data corresponding to text information, wherein the second material import page comprises an editing region for editing the text information.

10. The method according to claim 8, wherein the in response to a generation instruction, generating target multimedia data based on the target material data and the template comprises:

adjusting the target material data based on the editing information;

synthesizing the adjusted target material data with the template to obtain the target multimedia data; and playing the target multimedia data.

11. The method according to claim 10, wherein the editing information comprises one or more of: a time length of the material data to be imported, an audio attribute of the material data to be imported, and a resolution of the material data to be imported; and in a case that the target material data comprises target video data, the adjusting the target material data based on the editing information comprises one or more of:

based on the time length of the material data to be imported, intercepting a content corresponding to the time length from the target video data;

adjusting a playback speed of the target video data to control a playback time length of the target video data to be compatible with the time length of the material data to be imported;

based on the audio attribute, deleting audio data from the target video data;

adjusting a playing volume of the audio data in the target video data based on the audio attribute; and adjusting a resolution of the target video data to adapt to the resolution of the material data to be imported.

12. The method according to claim 10, wherein the editing information comprises one or more of: a size of the material data to be imported and a resolution of the material data to be imported; and in a case that the target material data comprises target picture data, the adjusting the target material data based on the editing information comprises one or more of:

adjusting a size of the target picture data based on the size of the material data to be imported; and adjusting a resolution of the target picture data to adapt to the resolution of the material data to be imported.

13. The method according to claim 10, wherein before playing the target multimedia data, the method further comprises:

displaying a preview page, wherein the preview page comprises a fourth displaying region; and the playing the target multimedia data comprises: playing the target multimedia data in the fourth displaying region.

14. The method according to claim 13, wherein the preview page further comprises a second function entrance for editing target material data comprised in the target multimedia data; and after displaying the preview page, the method further comprises:

displaying a material editing page in response to a touch operation performed on the second function entrance; and updating the target multimedia data in response to an editing operation performed on the target material data comprised in the target multimedia data in the material editing page.

15. The method according to claim 14, wherein the displaying a material editing page in response to a touch operation performed on the second function entrance comprises one or more of:

in a case that the target multimedia data comprises material data corresponding to a video, material data corresponding to an audio, and/or material data corresponding to a picture, displaying a secondary function entrance in response to the touch operation performed on the second function entrance, and displaying a corresponding material editing page in response to a touch operation performed on the secondary function entrance, wherein the secondary function entrance comprises one or more of a function entrance of capturing material data, a function entrance of replacing material data, a function entrance of cutting material data, and a function entrance of adjusting a volume of material data; and in a case that the target multimedia data comprises material data corresponding to editable text information configured in the template, displaying a material editing page comprising the text information in response to the touch operation performed on the second function entrance.

16. The method according to claim 8, wherein before obtaining the template corresponding to the currently browsed multimedia data, the method further comprises:

displaying original material data and original editing information for generating the multimedia data in response to a touch operation performed on a third function entrance of the multimedia data displayed in a page in which the multimedia data is currently browsed; and in response to a touch operation performed on the original material data, switching the original material data from a first display state to a second display state, and then displaying the original material data.

17. The method according to claim 16, wherein the displaying original material data and original editing information for generating the multimedia data comprises:

displaying the original material data in an order of playing time; and displaying the original editing information of a preset display quantity based on priorities of corresponding preset editing functions.

18. An apparatus for processing multimedia data, comprising:

at least one processor; and at least one memory communicatively coupled to the at least one processor and storing instructions that upon execution by the at least one processor cause the apparatus to:

obtain multimedia data, the multimedia data including multiple pieces of material data and editing information associated with the multiple pieces of material data, the multiple pieces of material data including at least one of video data, picture data, text data and audio data, the editing information including a time length and a sorting position of each piece of material data, the time length being a playing time length of the material data in the multimedia data, the sorting position indicating a playing order of the material data in the multimedia data;

display an editing page, wherein the editing page displays the material data in the multimedia data, and the each piece of material data is displayed in sequence based on playing instants of the material data in the multimedia data;

in response to a labeling operation performed on at least one piece of material data, label the at least one piece of material data; and in response to a template generation instruction, remove the labeled material data from the multimedia data and generate a template.

19. A computer-readable non-transitory medium, storing a computer program, wherein the computer program, when executed by a processor, causes the processor to perform the method according to claim 1.

20. A computer-readable non-transitory medium, storing a computer program, wherein the computer program, when executed by a processor, causes the processor to perform the method according to claim 8.

* * * * *